United States Patent
Nagata et al.

(10) Patent No.: US 8,140,789 B2
(45) Date of Patent: Mar. 20, 2012

(54) METHOD FOR REMOTE BACKUP AND STORAGE SYSTEM

(75) Inventors: Yuki Nagata, Odawara (JP); Ryoji Furuhashi, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 12/007,090

(22) Filed: Jan. 7, 2008

(65) Prior Publication Data

US 2008/0183993 A1 Jul. 31, 2008

(30) Foreign Application Priority Data

Jan. 29, 2007 (JP) ................................. 2007-017733

(51) Int. Cl.
*G06F 12/16* (2006.01)

(52) U.S. Cl. ........ 711/162; 711/161; 711/165; 711/114; 714/6.2; 714/6.22; 714/6.3

(58) Field of Classification Search .................. None
See application file for complete search history.

(56) References Cited

U.S. PATENT DOCUMENTS

| 2004/0257857 | A1* | 12/2004 | Yamamoto et al. | 365/154 |
| 2005/0149677 | A1* | 7/2005 | Shimada et al. | 711/114 |
| 2006/0039351 | A1* | 2/2006 | Furuhashi et al. | 370/351 |

FOREIGN PATENT DOCUMENTS

JP 2005-011277 6/2003

* cited by examiner

*Primary Examiner* — Kevin Ellis
*Assistant Examiner* — Alan Otto
(74) *Attorney, Agent, or Firm* — Foley & Lardner LLP

(57) ABSTRACT

In a storage system, a technique for promptly reading the backup data stored in the child storage device in the remote site side in case of disaster for the master site is provided. In this system, a parent storage device having a primary volume (V1) and a secondary volume (V2) is arranged at a master site, and a child storage device having a backup volume to store data of V2 is arranged at a remote site, and remote backup of data of V1 is carried out. In the remote site side, management information of objective volume is stored in one of devices. When the data of the backup volume is read, for example in one child storage device, a process is carried out where the management information is read, and on the basis thereof, data of a plurality of backup volumes is collected and integrated as one volume.

15 Claims, 18 Drawing Sheets

FIG. 2C

| PAIR MANAGEMENT TABLE (T2) ||
|---|---|
| LOGIC VOLUME ID | BACKUP ATTRIBUTE |
| 01 | PRIMARY |
| 11 | SECONDARY |

FIG. 2D

LU MANAGEMENT TABLE (T3)

| LU-ID | RAID LEVEL | CONNECTION TYPE (STORAGE DEVICE) | DRIVE TYPE | CAPACITY |
|---|---|---|---|---|
| 01 | RAID1 | INSIDE | FC | 10GB |
| 02 | RAID1 | INSIDE | FC | 20GB |
| 03 | RAID1 | INSIDE | FC | 30GB |
| 04 | RAID1 | INSIDE | FC | 10GB |
| 11 | RAID6 | EXTERNAL CHILD STORAGE #1 | SATA | 10GB |
| 12 | RAID6 | EXTERNAL CHILD STORAGE #1 | SATA | 30GB |
| 21 | RAID6 | EXTERNAL CHILD STORAGE #2 | SATA | 20GB |
| 32 | RAID6 | EXTERNAL CHILD STORAGE #3 | SATA | 10GB |

UPDATE

| 13 | RAID6 | EXTERNAL CHILD STORAGE #1 | SATA | 20GB |
| 14 | RAID6 | EXTERNAL CHILD STORAGE #1 | SATA | 10GB |

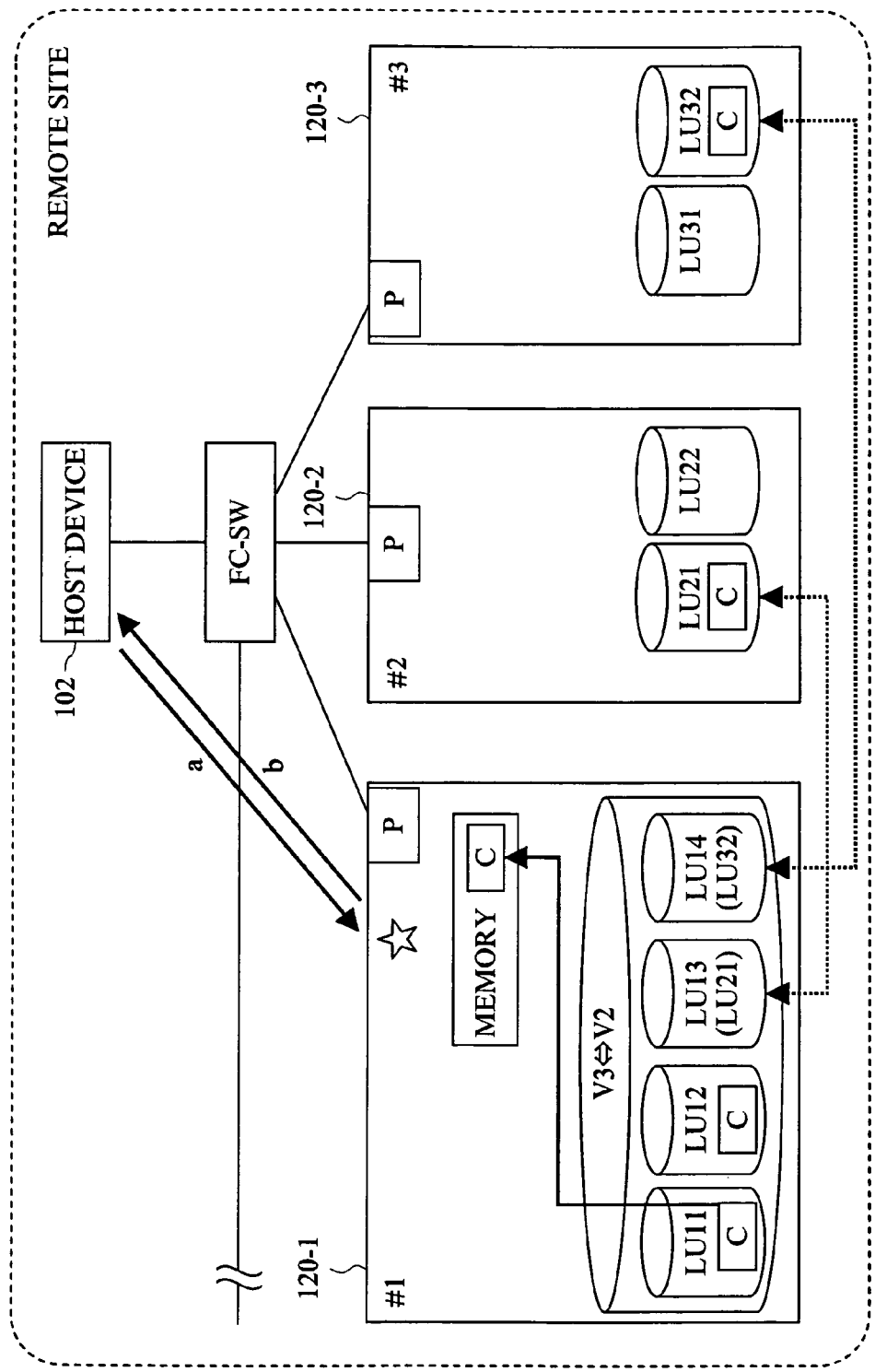

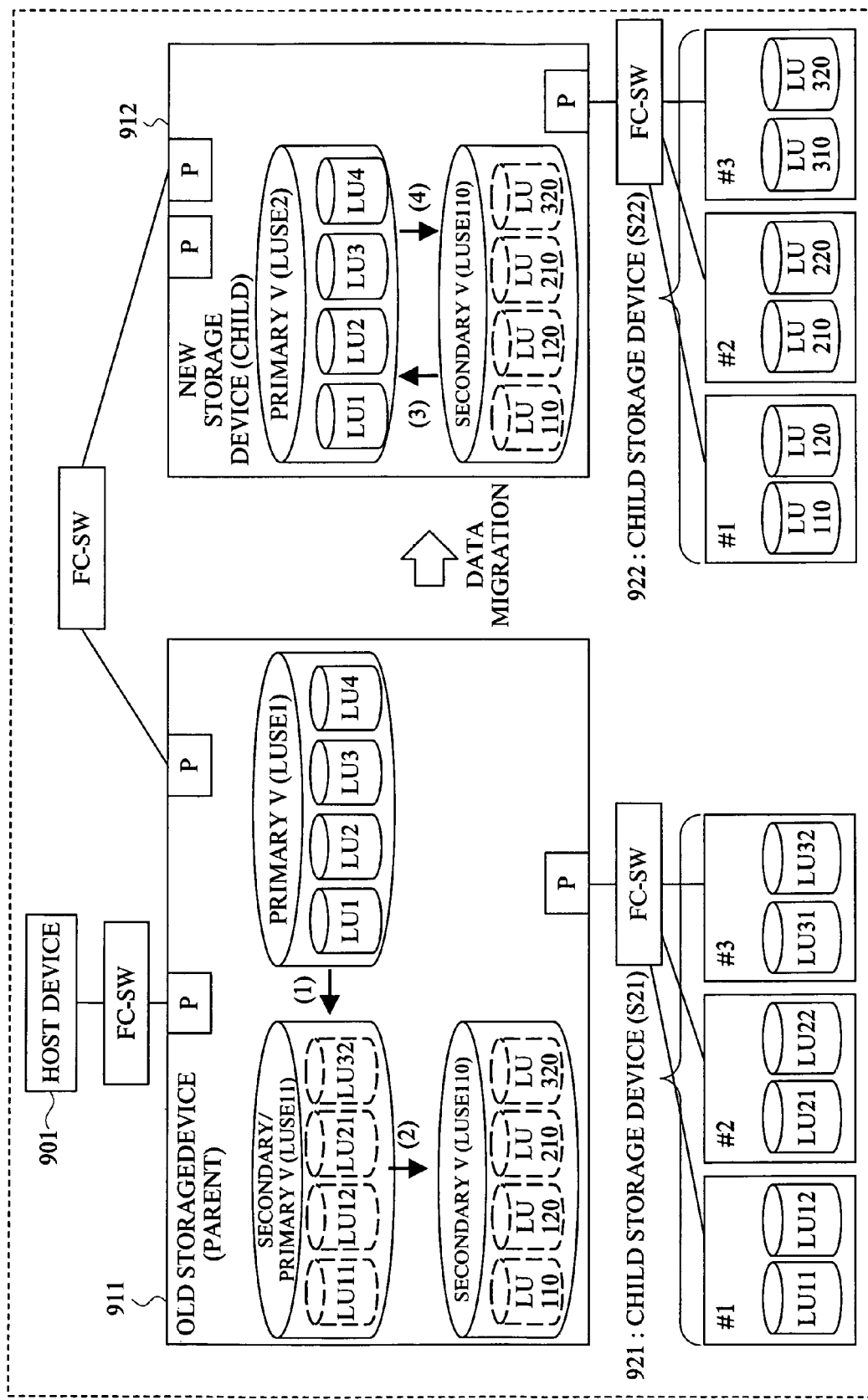

METHOD FOR REMOTE BACKUP AND STORAGE SYSTEM

CROSS-REFERENCE TO RELATED APPLICATION

The present application claims priority from Japanese Patent Application No. JP 2007-017733 filed on Jan. 29, 2007, the content of which is hereby incorporated by reference into this application.

TECHNICAL FIELD OF THE INVENTION

The present invention relates to a storage apparatus (disk array apparatus) and a storage system for controlling storage of data to a storage unit such as a hard disk drive (HDD) or the like, more specifically, it relates to a method for remote backup using an externally connected storage apparatus.

BACKGROUND OF THE INVENTION

In the conventional storage system, there is a configuration where a parent storage device is arranged at a master site, and a child storage device for saving backup data is arranged at a remote site. By use of an internal volume copy function (volume copy function), an external connection function (function for communication connection with an external child storage device), and a LUSE (Logical Unit Number Size Expansion) function and the like that the parent storage device has, a remote backup system (function) may be configured (FIG. 15).

In the above configuration, consider that when the parent storage device is damaged due to a disaster for the master site, backup data (secondary volume data) stored in the child storage device at the remote site side is retrieved. Herein, the backup data may be stored separately in a plurality of storage volumes (logic units or the like) in one child storage device or more. In this case, even if it is tried to retrieve the backup data in the child storage device from, for example, a host device at the remote site, it is not possible to retrieve the data of the plurality of volumes (logic units or the like) that configure the child storage device, as a continuous single unit of data. This is because, at the remote site side, the volumes and the data groups are not controlled as one backup volume, and so forth. In the above case, in order to retrieve the backup data at the remote site side normally, for example, it is necessary to prepare (connect) a substitutional parent storage device, and recover the original configuration manually and so forth, which takes much time and labor.

Further, in the above configuration, in the case where data is transferred from an old storage device (parent) to a new storage device (child), it takes much time and labor (FIG. 16, FIG. 17).

For example, in Japanese Patent Application Laid-Open Publication No. 2005-11277 (Patent Document 1), a storage device to be connected to an external storage is disclosed.

SUMMARY OF THE INVENTION

In the system mentioned in the above background art, for example, in case of disaster for the master site, even if it is tried to retrieve the backup data at the remote site side, it is not possible in the case mentioned above (the case where the backup data is stored separately in a plurality of volumes). Moreover, even if it is possible, it relatively takes much time and labor. It is desired to be able to retrieve the backup data in prompt and correct manners even in case of disaster or the like at the master site.

The present invention has been made in consideration of such a problem as mentioned above, and accordingly, an object of the present invention relates to such a storage system and remote backup system as mentioned above, and is to provide a technique for promptly retrieving the backup data stored in the child storage device at the remote site side. Further, in particular, another object of the present invention is to provide a technique for promptly retrieving the backup data of LUSE volumes and the like that has been stored separately in a plurality of storage volumes at the remote site side and accordingly could not be retrieved continuously as a single unit of data.

The typical ones of the inventions disclosed in this application will be briefly described as follows. In order to achieve the above object, according to one aspect of the present invention, there is provided a technology concerning a storage system comprising a controller and a storage device having memory areas, and a remote backup system, that has the following configuration.

In the present system, in a parent storage device (S1) at a master site, a primary volume (V1) to and from which data is inputted/outputted from/to a host device, and a secondary volume (V2) for backup of the data are arranged, and a process (remote backup process) is carried out for storing the data substance of the secondary volume (V2), into volumes (backup volumes such as logic units) in child storage devices at the remote site as backup data. In particular, suppose the case where the backup data is stored separately in one or more child storage device at the remote site, as a plurality of backup volumes. By use of functions (processes) including an internal volume copy function and an external connection function, and a LUSE function and the like that the parent storage device (S1) has, a remote backup system (function) is configured. In the parent storage device, by use of the internal volume copy function, data is copied from V1 to V2, and, by use of the external connection function between the parent storage device and the child storage device, data is copied from V2 to backup volumes in the child storage devices.

In the case when the parent storage device (S1) is damaged (unavailable state) due to a disaster or the like at the master site, it is desired to use the backup data at the remote site side. However, in the conventional art, it is not possible to retrieve the data of objective backup volumes in those child storage devices (S2) from, for example, the host device at the remote site, as a single continued unit of data (volume).

In the system according to the present invention, when the above remote backup system (function) is configured and repaired, management information (C) of objective volumes are stored in a specified place at the remote site. The management information (C) includes objective volumes (V1, V2, backup volume) and corresponding relations such as the storage places (storage devices) and volume structure information. The storage places of the management information (C) are, for example, inside of the child storage device (S2), especially writing on each backup volume, memories in host device connected to the child storage device (S2) and the like.

And, in the present system according to the present invention, in the case when the use of backup data of objective volume (V1) is necessary, at the remote site side, by use of any one of the following methods (structures), on the basis of reference to the management information (C), backup data stored in the child storage device is read as a single unit of data. In particular, the objective volume (V1) is a LUSE volume, and the backup data thereof is stored as data groups of a plurality of backup volumes in a plurality of child storage devices.

(1) As a first method, in one child storage device among devices storing backup volumes, a process is carried out to integrate (restructure) data groups of backup volumes as one volume (V3), on the basis of the read management information (C), by copying data among a plurality of child storage devices. Data of integrated volume (V3) can be read from the host device or the like.

(2) As a second method, in the host device connected to the child storage device, a process is carried out to integrate data groups of backup volumes as one volume, on the basis of the read management information (C), by use of logic volume control function and the like.

(3) As a third method, in a substitutional parent storage device newly prepared (connected) to the system, an automatic process to restore data is carried out, on the basis of the read management information (C). That is, in the same manner as in the above (1) and (2), between the substitutional parent storage device and the child storage device, by copying data and the like, data groups of backup volumes are integrated as one volume (V3) in the substitutional parent storage device, and data is restored from the volume (V3) (equivalent to V2) to a primary volume (V1).

Further, by use of backup data that is retrievable by the above structure and process, a restore process of the data of the primary volume (V1) to the parent storage device at the master site may be carried out.

The effects obtained by typical aspects of the present invention will be briefly described below. According to the present invention, in a storage system and a remote backup system, in case of a disaster or the like for the master site, it is possible to promptly retrieve the backup data stored in the child storage device at the remote site side. Further, in particular, it is possible to promptly retrieve the backup data of LUSE volumes and the like that has been stored separately in a plurality of storage volumes conventionally and accordingly could not be read continuously as a single unit of data.

BRIEF DESCRIPTIONS OF THE DRAWINGS

FIG. 2C is a diagram showing a configuration example of management information in the storage system according to the first embodiment of the present invention;

FIG. 2D is a diagram showing a configuration example of management information in the storage system according to the first embodiment of the present invention;

FIG. 3 is a diagram showing retrieving of backup data at a remote site in the storage system according to the first embodiment of the present invention;

Figure 16:
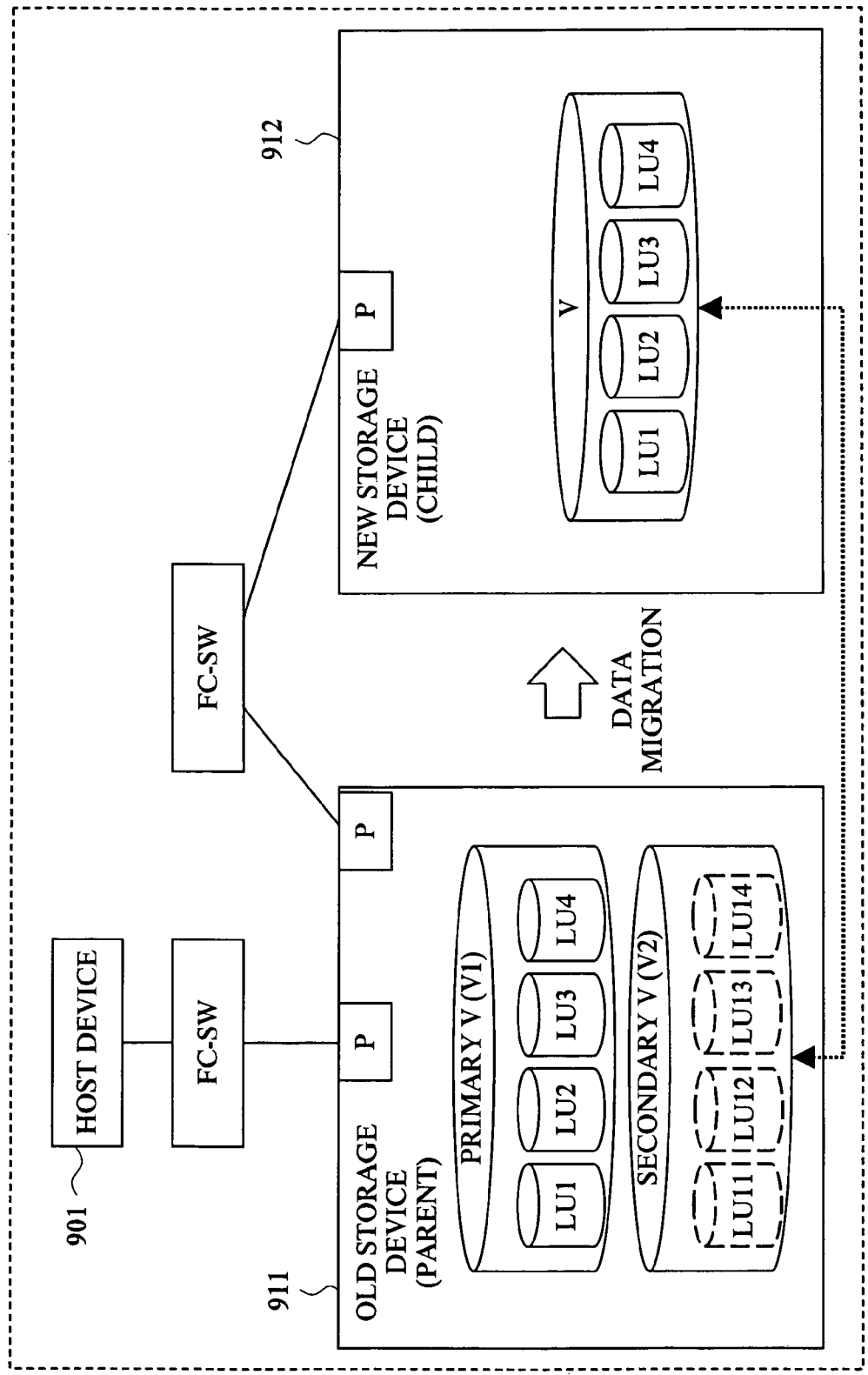

FIG. 16 is a diagram showing a structure in the case where a data migration is carried out from an old storage device to a new storage device in a storage system according to a conventional art; and FIG. 17 is a diagram showing a structure in the case where data migration is carried out from an old storage device to a new storage device, and there exists an externally connected child storage device, in a storage system according to a conventional art.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Hereinafter, as necessary, volume (storage volume) is abbreviated as "V." Logic unit is abbreviated as LU. Primary volume (first volume) is abbreviated as "primary V," and secondary volume (second volume) is abbreviated as "secondary V."

<Outline>

The outline of the present embodiment is as the following. In the present storage system, at normal operation, a remote backup process is carried out where data of V2 in a pair of LUSE primary V (V1) and LUSE secondary V (V2) of a parent storage device (S1) at master site is stored as backup data (a plurality of backup volumes) in a plurality of child storage devices (S2) at remote site. In the case when the parent storage device is damaged due to a disaster for the master site, at the remote site side, it is desired to retrieve backup data (data of V2), but it is not possible to retrieve the data of volumes separately stored in the plurality of child storage devices from a host device or the like, as a single continued unit of data (volume).

In the present system, management information (C) of objective volume (V2) is stored inside the remote site (child storage device or host device or the like). And, for example, according to any one of the following methods, backup data is retrieved at the remote site side.

(1) As a first method, in a child storage device (S2), a process to integrate the objective volume (V2) is carried out, on the basis of the management information (C), by copying V among a plurality of child storage devices (S2) (the objective volume is made readable as a single unit of data).

(2) As a second method, in the host device, a process to integrate the objective volume is carried out, on the basis of the management information (C), by use of LVM function and the like.

(3) As a third method, in a substitutional parent storage device newly prepared, a process to integrate the objective volume is carried out by an automatic restore process.

<Conventional Art—System>

Figure 15:
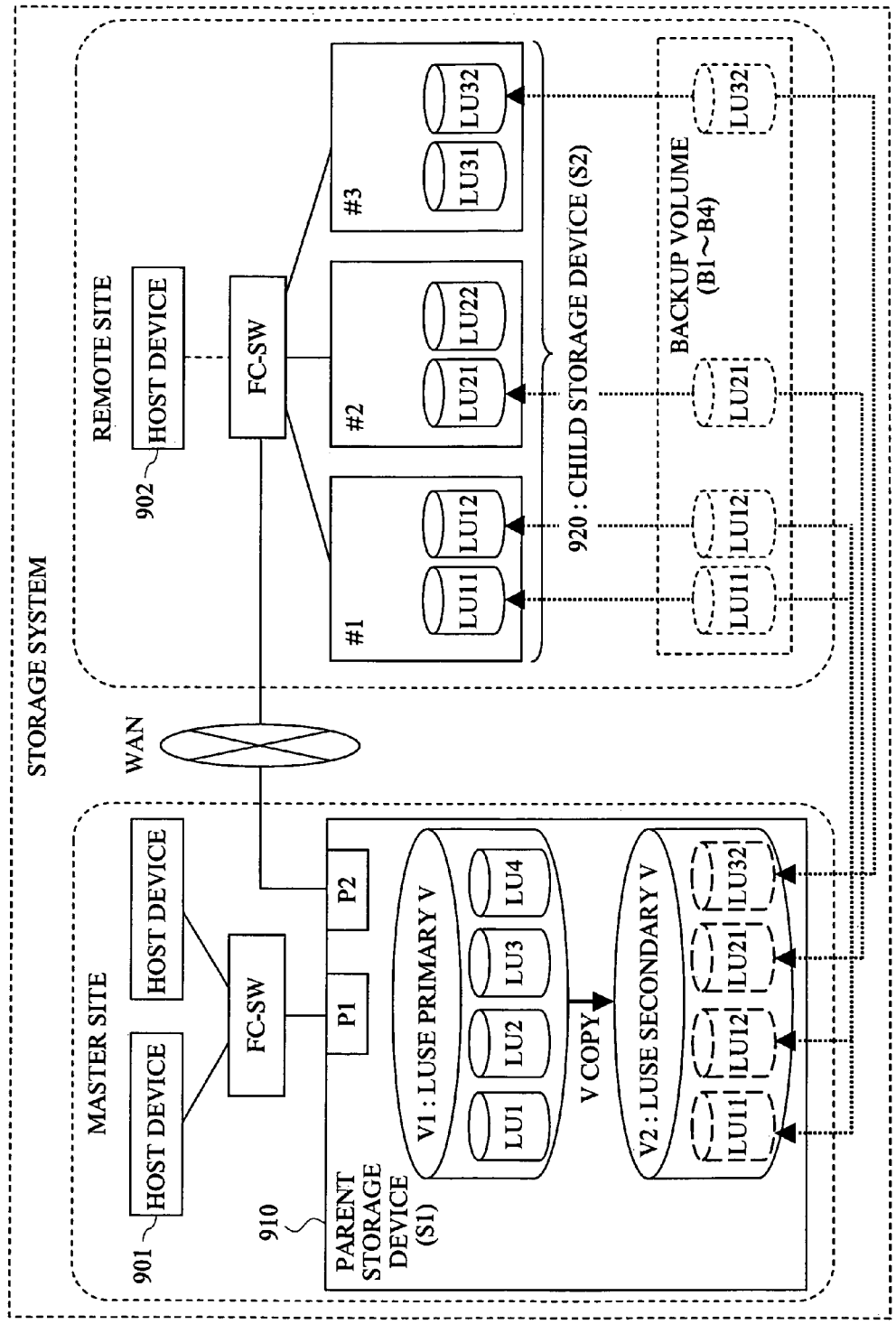
FIG. 15 is a diagram showing a structure of a storage system according to a conventional art.

With reference to FIG. 15 to FIG. 17, the conventional art (assumption art) to embodiments of the present invention is briefly explained, in order to make explanations of the embodiments of the present invention easy to understand.

In FIG. 15, an assumption system configuration is shown. In the present system, at the master site (first site), a parent storage device (S1) 910 is arranged as a daily operation storage, and at the remote site (second site), a child storage device (S2) 920 is arranged for storing backup data of the parent storage device (S1) 910. With regard to the child storage device (S2) 920, there may be, for example, a plurality of units (#1 to #3). Typically, as a child storage device, one having smaller scale and performance than the parent storage device may be used.

Note that, "master" means the part used for regular operation, and "remote" means the part to retain backup data. Further, "child" means the side to be connected externally to "parent."

To the parent storage device (S1) 910, for example, via FC-SW (fibre channel switch) or the like, a host device 901 that carries out operation processes is connected. The parent storage device (S1) 910 and the child storage device (S2) 920 are, for example, fibre channel (FC) connected by use of the external connection function of the parent storage device (S1) 910. The connection is made via WAN (wide area network), by use of a device such as an extender or the like.

The parent storage device (S1) 910 has a V copy function (internal volume copy function) and an external connection function, as the functions to structure the remote backup function, and further, it has LUSE function (LUSE: Logic Unit Number Size Expansion) and the like. The V copy function is the function to copy volumes inside the storage device. The external connection function is the function for communication connect with an external child storage device (S2) 920 and the like. The LUSE function as a known art enables handling of a large size of data, by using a plurality of LUs put together as a single volume. Hereinafter, for simplicity, the case where one volume of LUSE function (LUSE volume) exists in the parent storage device or the like is explained.

In the parent storage device (S1) 910, by use of the LUSE function, a plurality of LUs are used as one volume (LUSE primary V (or simply, primary V): V1). For example, suppose that an LU group to structure the primary V (V1) is of LU1 to LU4. Reading and writing (input and output) of data from the host device 901 to the parent storage device (S1) 910 are made to this primary V (V1).

Further, in the parent storage device (S1) 910 at the master site, as a backup volume to be paired up with this primary V (V1), secondary volume of the same capacity (LUSE secondary V (or simply, secondary V): V2) is defined. And, at regular operation, in the parent storage device (S1) 910, by use of the V copy function, volume copy (replica creation, data-sync process) from the primary V (V1) to the secondary V (V2) in the control of this pair is carried out, so that backup is carried out. The LU group of the secondary V (V2) corresponding to the LU group (LU1 to LU4) of the primary V (V1) is made by, for example, {LU11, LU12, LU21, LU32}.

The data substance of this backup volume (secondary V (V2)) exists as a backup volume (B) in the child storage device (S2) 920 at the remote site side, by the external connection function. In particular, the backup volume (B) is divided into a plurality of backup volumes (B1 to B4) over the plurality of child storage devices (#1 to #3) 920, and exists as corresponding LU group {LU11, LU12, LU21, LU32}. In this example, they exist as LU11 (B1) and LU12 (B2) in the child storage device #1, LU21 (B3) in the child storage device #2, and LU32 (B4) in the child storage device #3. By use of the external connection function, between parent and child storage devices, as indicated by the arrows, the data substance is remotely copied between corresponding LUs respectively.

The above backup volume is, at the master site (parent storage device (S1) 910) side, controlled as LUSE secondary V (V2), but at the remote site side, it is controlled as normal logic volumes (LUs), and is not controlled as one volume.

In this manner, in the storage system including the parent storage device (S1) 910, by use of both the external connection function and the V copy function, it is possible to configure a remote backup system (function). Further, particularly in this case, the case where the LUSE function is used in combination is shown.

In the above structure, when the parent storage device 910 is damaged due to a disaster at the master site (unavailable state), the following situation may occur. With the purpose of recovering of the primary V (V1), here consider reading (acquiring) the backup volume (B) as the data substance of the secondary V (V2) stored in the child storage device at the remote site side, in other words, restructuring of the secondary V (V2) data.

There is a case where the backup volume (B) is stored separately in a plurality of storage volumes in one or more child storage device (S2) 920. That is, as shown in this example, it is the case where a plurality of LUs (LU11, LU12, LU21, LU32) that structure the volume (B) are stored separately in the plurality of child storage devices (#1 to #3) 920. In this case, even if it is tried to read the backup volume (B) in the child storage device (S2) 920, from for example the host device 902 (or SVP or the like) at the remote site side, it is not impossible to read the a plurality of storage volumes (B1 to B4) that is a plurality of LUs as a continued single unit of data (volume). This is because, as mentioned previously, the backup data is controlled as the secondary V (V2) at the master site side, but at the remote site side it is not controlled as one volume.

In the above case, in order to retrieve the backup data (B) at the remote site side, for example, it is necessary to prepare (connect) a substitutional parent storage device to the system to recover the original configuration manually and so forth, which takes much time and labor.

<Conventional Art—Backup Process and Restore Process>

With reference to FIG. 15, the backup process and the restore process in the assumption system configuration are briefly explained. The same processes are used in the present embodiment.

First, the backup process (online backup process) is as the following. In the parent storage device (S1) 910, a backup process from the primary V (V1) to the secondary V (V2) as a pair is carried out by use of the V copy function (replica creation function). Timing of backup is daily, monthly and so forth.

The pair assumption state is "pair suspend (pair temporary division)" state. Commands and procedures are as the following. (1) When backup is carried out, backup start instruction is sent from the host device 901 to the parent storage device (S1) 910. (2) Completion notification is sent from the instructed parent storage device (S1) 910 to the host device 901. (3) "Pair suspend" instruction is sent from the host device 901 to the parent storage device (S1) 910.

Next, the restore process is as the following. In the parent storage device (S1) 910, a restore process is carried out from the secondary V (V2) to the primary V (V1) by use of the V copy function (replica creation function). This is carried out in the case of mismatch of data of the primary V (V1).

The pair assumption state is "pair suspend" state. Commands and procedures are as below. (1) When restore is carried out, restore start instruction is sent from the host device 901 to the parent storage device (S1) 910. (2) Completion notification is sent from the instructed parent storage device (S1) 910 to the host device 901. (3) "Pair suspend" instruction is sent from the host device 901 to the parent storage device (S1) 910.

The above respective processes can be made by use of a known V copy function (replica creation function) and the like, while the online business processing by the host device 901 is continued, and without intervention of the host device 901.

<Conventional Art—Storage Migration>

Further, in FIG. 16 and FIG. 17, relating to a fourth embodiment (fourth method) and the like described below, migration (transfer) in the conventional storage system is briefly explained. In FIG. 16, an old storage device (parent) 911 stores the primary V (V1) and the secondary V (V2) in the same manner as described previously. To the system, as an externally connected storage device of the old storage device (parent) 911, a new storage device (child) 912 as a data migration destination is connected. With the secondary V (V2) as LU in the new storage device 912, by use of V copy function (replica creation function) by pair control and the like, data copy is carried out from the primary V (V1) to the secondary V (V2), so that data migration is carried out.

Further, in FIG. 17, the case where external connection exists in migration of the conventional storage device as shown in FIG. 15 is explained. It is explained that the present conventional method takes much time and labor.

Now consider a structure where the old storage device (parent) 911 has externally connected child storage devices (S21) 921 (e.g.: #1 to #3) and data migration is carried out to new storage device (child) 912. In this case, it is necessary to prepare (connect) child storage devices (S22) 922 (#1 to #3) to the new storage device (child) 912 side in the same manner. The old storage device (parent) 911 and the new storage device (child) 912 are connected in form of external connection in the same manner as described above. From the child storage device (S21) 921 connected to the old storage device (parent) 911 to the child storage device (S22) 922 connected to the new storage device (child) 912, data migration is carried out by use of the above V copy function (replica creation function) and the like.

The procedures of data migration process (1) to (4) are for example the following (also shown in FIG. 17). (1) First, data copy from the primary V (e.g.: LUSE1) in the old storage device (parent) 911 to the secondary V (e.g.: LUSE11) in the child storage device (S21) 921 is carried out while normal operation. (2) With the secondary V (LUSE11) of the child storage device (S21) 921 taken as primary V, data copy is carried out to the secondary V (e.g.: LUSE110) connected to the new storage device (child) 912. In this manner, data migration is carried out to the child storage device (S22) 922 connected to the new storage device (child) 912. (3) From the secondary V (LUSE110) of the new storage device (child) 912 to a built-in primary V (e.g.: LUSE2), data restore process is made. (4) When the restore process is completed, normal operation is started by the primary V (LUSE2). For example, daily backup process from the primary V (LUSE2) to the secondary V and the like are carried out.

Meanwhile, the above processes (1) to (4) are for the case where backup is carried out from the parent storage device to the child storage device, and in the case when the data of the child storage device is not backup data but master data, the above processes (1) and (4) are not necessary.

(First Embodiment)

Based on the foregoing, with reference to FIG. 1 to FIG. 6 and the like, a first embodiment of the present invention is explained hereinafter. In the first embodiment, as a first method, at the remote site side, backup volumes stored separately in a plurality of child storage devices 120 are integrated by one child storage device, and can be read from host device.

<System>

Figure 1:
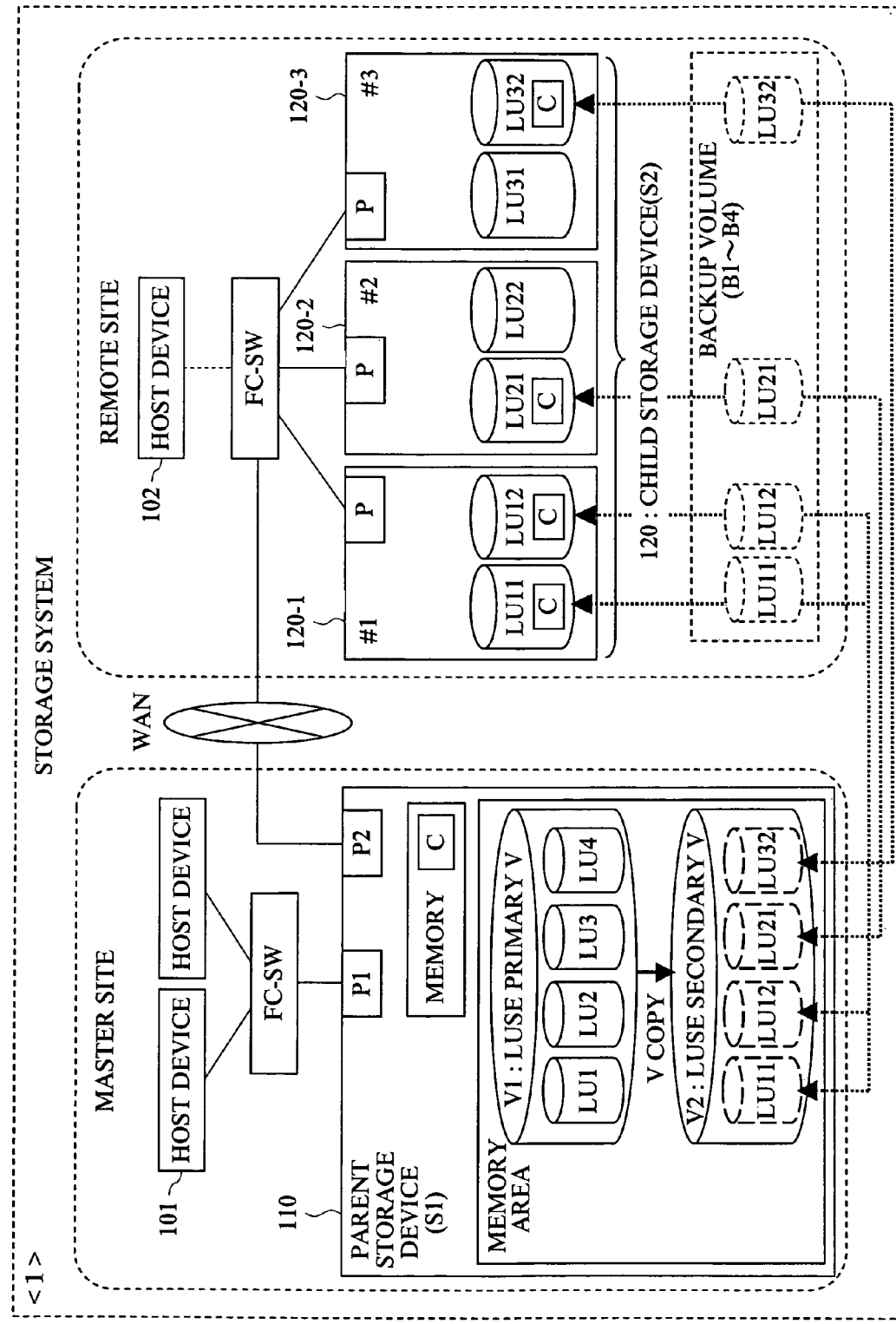
FIG. 1 is a diagram showing the structure of a storage system according to a first embodiment of the present invention.

In FIG. 1, a structure (first method) of a storage system according to the first embodiment is shown. The basic structure is similar to the assumption system configuration described above. In the present system, at the master site, a parent storage device (S1) 110 and a host device 101 to be connected thereto and the like are arranged, and at the remote site, child storage devices (S2) 120 for storing backup data and the like are arranged. As the child storage devices (S2) 120, there are a child storage device (#1) 120-1, a child storage device (#2) 120-2, and a child storage device (#3) 120-3. The parent storage device (S1) 110 and the child storage device (S2) 120 group are connected via FC-SW and WAN. Further, at the remote site side, a host device 102 may be connected to the child storage device (S2) 120. As the child storage device (S2) 120, one having smaller scale and performance than the parent storage device (S1) 110 may be used.

The parent storage device (S1) 110 stores programs and various control information, management information (C) and the like to a memory. Ports (P, P1, P2) are ports corresponding to communication connection processes with the outside of the device. In the memory area in the parent storage device (S1) 110, LUSE primary V (V1) to which data is input and output from the host device 101 is retained, and, LUSE secondary V (V2) to become its pair is retained. The data substance of the secondary V (V2) exists in the child storage device (S2) 120 at the remote site side as LUs as backup volumes (B: B1 to B4).

In this example, V1 is structured by LU1 to LU4, and in correspondence, V2 is structured by LU11, LU12, LU21, LU32. In the child storage device (#1) 120-1, there are LU11 (B1), LU12 (B2). In the child storage device (#2) 120-2, there are LU21 (B3), LU22. And in the child storage device (#3) 120-3, there are LU31, LU32 (B4).

The parent storage device (S1) 110 has, as its functions, a remote backup function, a LUSE function and the like. The remote backup function is structured by the V copy function, and the external connection function.

In this system, as countermeasures at a disaster at the master site, the following is carried out in system configuration and correction and normal operation and the like. The management information (C) about the secondary V (V2) in the parent storage device (S1) 110 is written on respective LUs (B1 to B4) structuring the secondary V (V2). More specifically, the management information (C) is written on respective LUs (LU11, LU12, LU21, LU32) as backup volumes (B) in a plurality of child storage devices (S2) 120 and saved. For example, the parent storage device (S1) creates and updates the management information (C) along with definition and update of volumes, and saves them on the above specified place (inside of LU and the like). The contents of the management information (C) are appropriately updated along with operation.

Meanwhile, in typical operation, backup data is not retained only in the child storage device (S2) 120 at the remote site, but backup data is held also in the parent storage device (S1) 110 at the master site. In the present example, the situation where backup data cannot be acquired from the parent storage device 110 in particular due to a disaster at the master site is supposed. Therefore, the case to retain backup data only at the remote site side is explained.

Further, the present invention may be applied to the case where backup data is stored separately in a plurality of storage volumes (LU) in not plural but one child storage device (S2) 120 in the same manner.

<Management Information>

In FIG. 2A to FIG. 2D, examples of table configuration of the management information (C) is shown. The management information (C), when a plurality of LUs are handled as one LUSE volume by the LUSE function and at the time of remote backup, includes volume information (volume structure information) and the like.

Figure 2A:
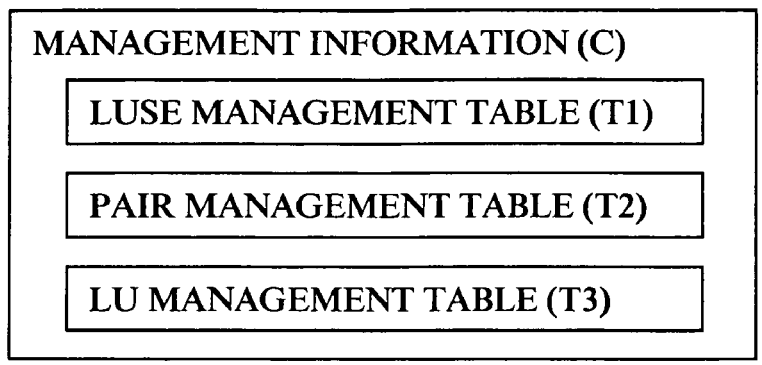
FIG. 2A is a diagram showing a configuration example of management information in the storage system according to the first embodiment of the present invention.

In FIG. 2A, as the management information (C), this example has LUSE management table (T1), pair management table (T2), LU management table (T3). The LUSE management table (T1) is information of combination of a plurality of LUs of LUSE volume. The pair management table (T2) is information for pair control of volume (pair management information). The LUSE management table (T3) is information including correspondence information between respective LUs and LUs in the child storage device (S2) 120, and capacity of each LU and the like.

Figure 2B:
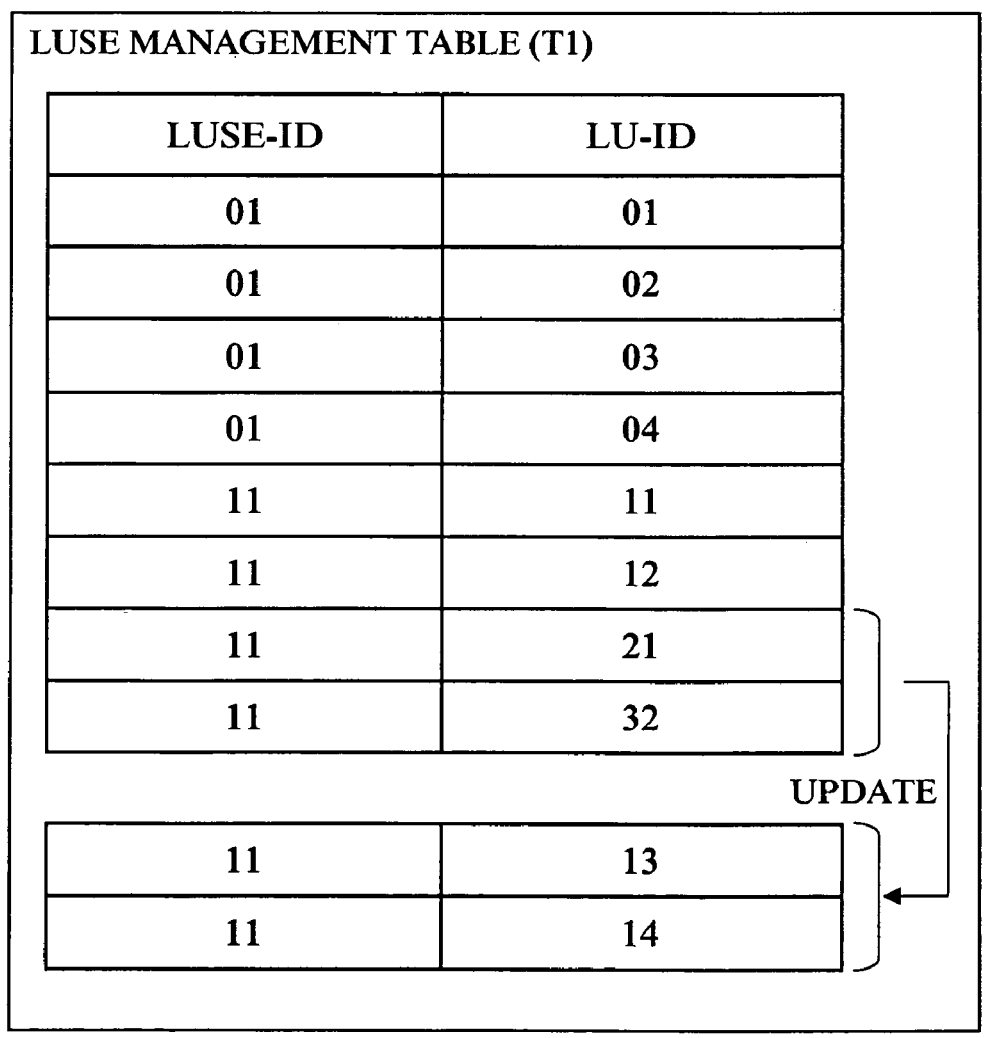
FIG. 2B is a diagram showing a configuration example of management information in the storage system according to the first embodiment of the present invention.

In FIG. 2B, the LUSE management table (T1) has information of correspondence relation between LUSE volumes (V1, V2) and LUs that structure them. The LUSE management table (T1), in this example, has LUSE-ID (LUSE number) and LU-ID (LU number). For example, LUSE primary V (V1) is structured by four LUs (LU1 to LU4) whose LUSE-ID is "01" and LU-ID is "01" to "04." LUSE secondary V (V2) is structured by four LUs (LU11, LU12, LU21, LU32) whose LUSE-ID is "11," and LU-ID is "11," "12," "21," "32."

In FIG. 2C, the pair management table (T2) has a logic volume ID and its backup attribute information. The logic volume ID, in this example, is LUSE-ID of LUSE volumes (V1, V2) to become a pair. The backup attribute is, in this example, a state value such as "primary" (showing the backup (replication) source), or "secondary" (showing the backup (replication) destination) and the like. For example, LUSE primary V (V1) whose logic volume ID is "01" and backup attribute is "primary," and LUSE secondary V (V2) whose logic volume ID is "11" and backup attribute is "secondary" are managed as a pair.

The LU management table (T3) has detailed information of each LU, and in this example, it has information of LU-ID, RAID level, connection type (storage device), drive type, capacity and the like. The LU-ID is same as shown in the LUSE management table (T1). The RAID level is the level of RAID control applied to the LU concerned (e.g.: RAID1, RAID6). The connection type shows the state of connection and storage of the LU concerned (correspondence between LU and child storage device (S2) 120), and shows that the LU concerned is stored in own storage device (parent) ("inside"), or, that it is stored in externally connected storage device (child) ("external child storage device #1" or the like) and so forth. The state in the present example is as shown in FIG. 1 and the like. The drive type shows the type of HDD and the like structuring the area of the LU concerned. The capacity is the capacity (size) of the LU concerned.

<Retrieving Backup Data>

In FIG. 3, a configuration for retrieving the backup data (V2) at the remote site side, regarding a damage of the parent storage device (S1) 110 or the like in case of disaster at the master site in the system according to the first embodiment is shown.

One unit of respective child storage devices (#1 to #3) 120 corresponding to the retention of objective secondary V (V2) i.e. a plurality of backup volumes (B), for example, the child storage device (#1) 120-1 is the integration destination (shown with a star symbol), and the process is carried out as described below. Herein, integration means that putting (collecting) data groups structuring read objective secondary V (V2), that is a plurality of backup volumes (B) together into one device, and structure to make it retrievable as one volume (V3).

One child storage device (S2) 120 to become the integration destination may be arbitrarily designated by a user (who reads backup volumes). In the present example, for specifying child storage device (S2) 120 which is the destination of retrieving and integration of backup data, a host device 102 is arranged at the remote site. Meanwhile, it is unnecessary to connect this host device 102 in ordinary operation.

At the child storage device (#1) 120-1 which is the integration destination, the management information (C) written on LUs (LU11, LU12) retained in own device in the objective volume (B) is read to, for example, memory. And, the child storage device (#1) 120-1 refers to the management information (C) to specify the LU group structuring the original secondary V (V2). More specifically, in the present example, from FIG. 2, four of {LU11, LU12, LU21, LU32} and respective child storage devices (#1 to #3) 120 that have these four are specified. Further, among them, it is specified that LUs not retained in own storage device (#1) 120-1 are LU21 in the child storage device (#2) 120-2, and LU32 in the child storage device (#3) 120-3.

When the above LU and the like are specified, the child storage device (#1) 120-1 secures the memory area for the volume (V3) to become the integration destination. That is, the child storage device (#1) 120-1 secures LU having the same size as LU in other device and existing in own device, and not in use. And the child storage device (#1) 120-1 acquires data of LUs (LU21, LU32) in other child storage devices (#2, #3) 120, to secured LU area by data copy. In the present example, as indicated by arrows, data of LU21 is copied to LU13, and data of LU32 is copied to LU14.

In the child storage device (#1) 120-1 at the integration destination, data copy (collection) from LUs (LU21, LU32)

of other child storage devices (#2, #3) 120 is completed, and the LU group (LU11, LU12, LU13, LU14) corresponding to all data (B1 to B4) structuring the objective backup volume (B) is prepared. And, the child storage device (#1) 120-1 integrates the prepared LU group as one volume (V3) on the basis of the management information (C), and makes it recognized as one continuous readable unit of data from the host device 102 at the remote site. The control information in the child storage device (#1) 120-1 is also updated. The data contents of this integrated volume (V3) are same as those at the original secondary V (V2). In this manner, from the host device 102 at the remote site, it becomes possible to read volume (V3) of objective backup data in the child storage device (#1) 120-1 at the integration destination that is restructured secondary V (V2).

By the integration process considering the secondary V (V2), the table of management information (C) is updated as shown in FIG. 2. In other words, in the LUSE management table (T1), LU-ID is changed from LU21 to LU 13, from LU32 to LU14. Further, in the LU management table (T3), the connection type of LU21 is changed from "external child storage device #2" to "external child storage device #1," and the connection type of LU32 is changed from "external child storage device #3" to "external child storage device #1."

The action at the time of integration and retrieving backup data is for example as described below. From program (storage use program or the like) of the host device 102 at the remote site, for example, to the child storage device (#1) 120-1 that user designates, request (command or the like) of integration of read objective volume (V2) is sent (a). This request may be sent via, for example, IP network for control communication not illustrated. The child storage device (#1) 120-1 that receives the request carries out the integration process, and generates volume (V3) of integrated backup data. And it sends a response to the effect that the objective volume (V3) is readable, to the host device 102 at the remote site (b). The host device 102 that receives the response retrieves data of the objective volume (V3) from the child storage device (#1) 120-1.

Note that, when an information processor for management (SVP: service processor) is connected to the child storage device (S2) 120, the host device 102 at the remote site is capable of carrying out integration according to the above instruction and the action to retrieve backup data from SVP in the same manners.

<Master Device Configuration>

Figure 4:
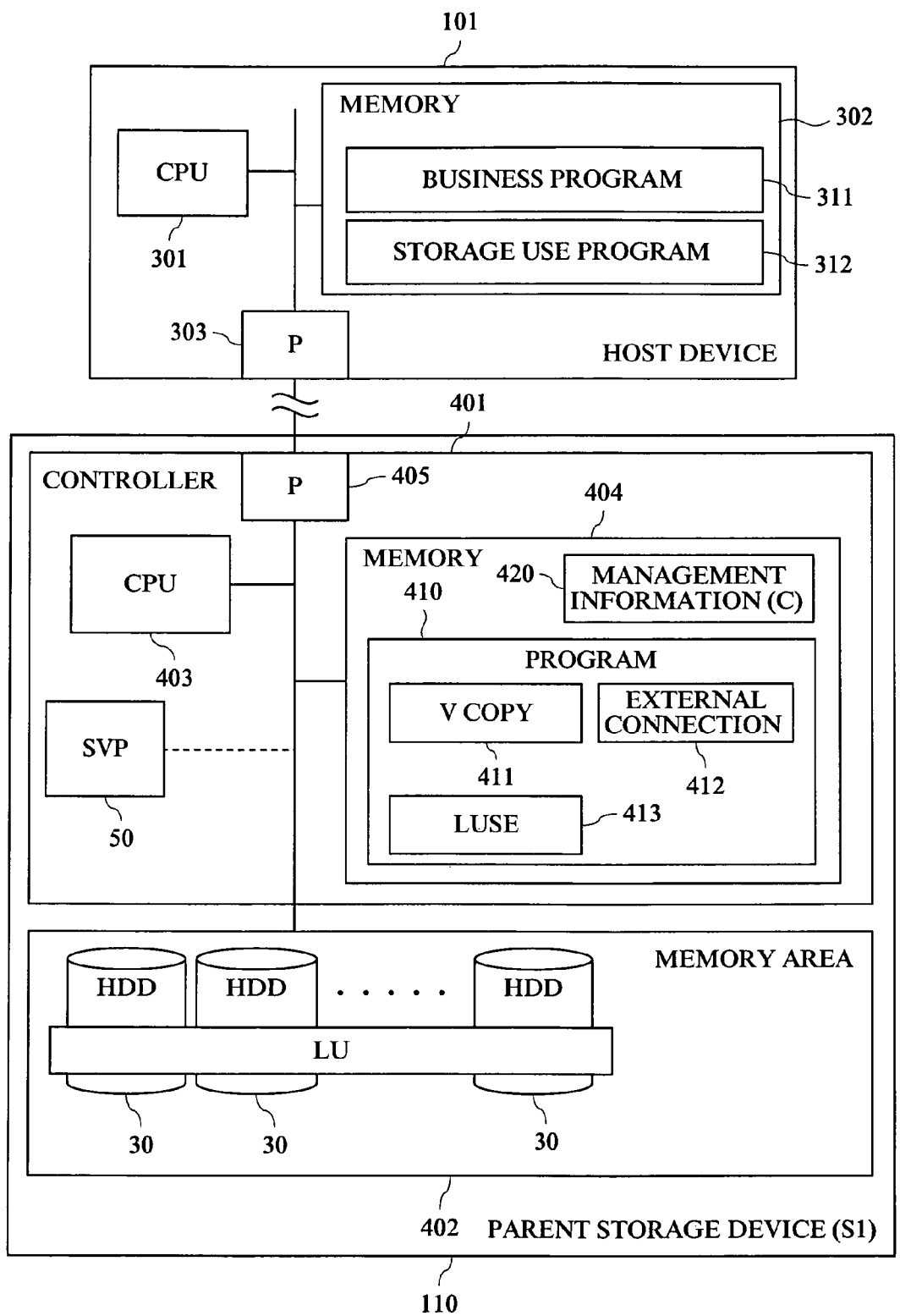
FIG. 4 is a diagram showing a hardware structure of a host device and a parent storage device at a master site side in the storage system according to the first embodiment of the present invention.

In FIG. 4, the hardware configuration of the host device 101 and the parent storage device (S1) 110 at the master site is shown.

The host device 101 has a CPU 301, a memory 302, a port (P) 303, and an input device (keyboard and the like), an output device (display and the like) not illustrated and the like. In the host device 101, the memory 302 has a business program 311 for carrying out business processes, and a storage use program 312 for managing and using the parent storage device (S1) 110. User of the host device 101, by use of the function of the storage use program 312, reads and writes data to LU in the parent storage device (S1) 110. From the host device 101, it is not necessary to recognize the LU group stored separately, a LUSE volume (V1) is designated as objective, so that input/output access is carried out.

The parent storage device (S1) 110 has a controller 401, a storage area (storage) 402 supplied by a memory device group such as HDD 30, and controls (RAID control and the like) storage of data to the storage area 402 by the controller 401. The controller 401 has not only the control function of entire storage device, but also a function (channel adapter: CHA) to carry out channel I/F (host I/F) control-process for external communications, a function (disk adapter: DKA) to carry out disk I/F control process for communications with disk (HDD 30) of inside storage area and the like. In the storage area 402, logic volumes such as LUs are secured on storage device such as HDD 30. Further, to a bus (internal net) of storage device, SVP 50 may be connected (built-in or external connection or the like). In the SVP 50, known process of maintenance management system can be made.

The controller 401 has a CPU (processor) 403, a memory 404, a port (P) 405 and the like. The CPU 403 executes the program 410 on the memory 404, thereby realizing various functions. The management information (C) 420 and the like are retained on the memory 404. The program 410 has respective programs corresponding to the V copy function (411), the external connection function (412), and the LUSE function 413. By the V copy function (411) and the external connection function (412), the remote backup function is configured.

<Remote—Device Configuration>

Figure 5:
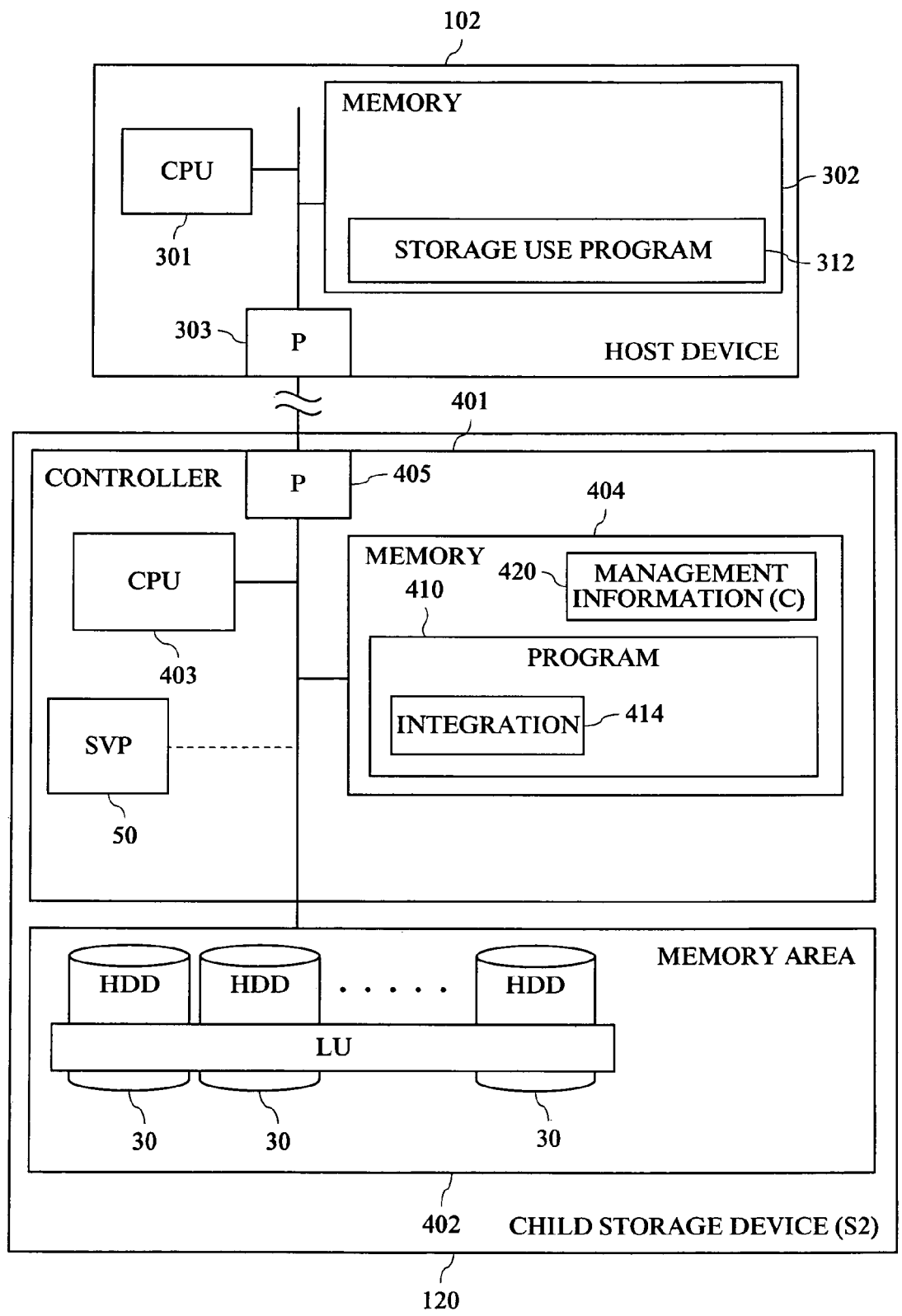
FIG. 5 is a diagram showing a hardware structure of a host device and a child storage device at a remote site side in the storage system according to the first embodiment of the present invention.

In FIG. 5, the hardware configuration of the host device 102 and the child storage device (S2) 120 at the remote site is shown. Basically, it is similar to the configuration at the master site in FIG. 4.

The host device 102 has, in the memory 302, a storage use program 312 for controlling and using the child storage device (S2) 120. By use of the function of the storage use program 312, user can perform the action for retrieving backup data.

In the child storage device 120, the memory 404 has the management information (C) 420 and the like necessary for the integration process and the like, and an integration program (414) for the integration process. At the child storage device (S2) 120 side, by the integration program (414), integration process is carried out.

<Integration Process>

Figure 6:
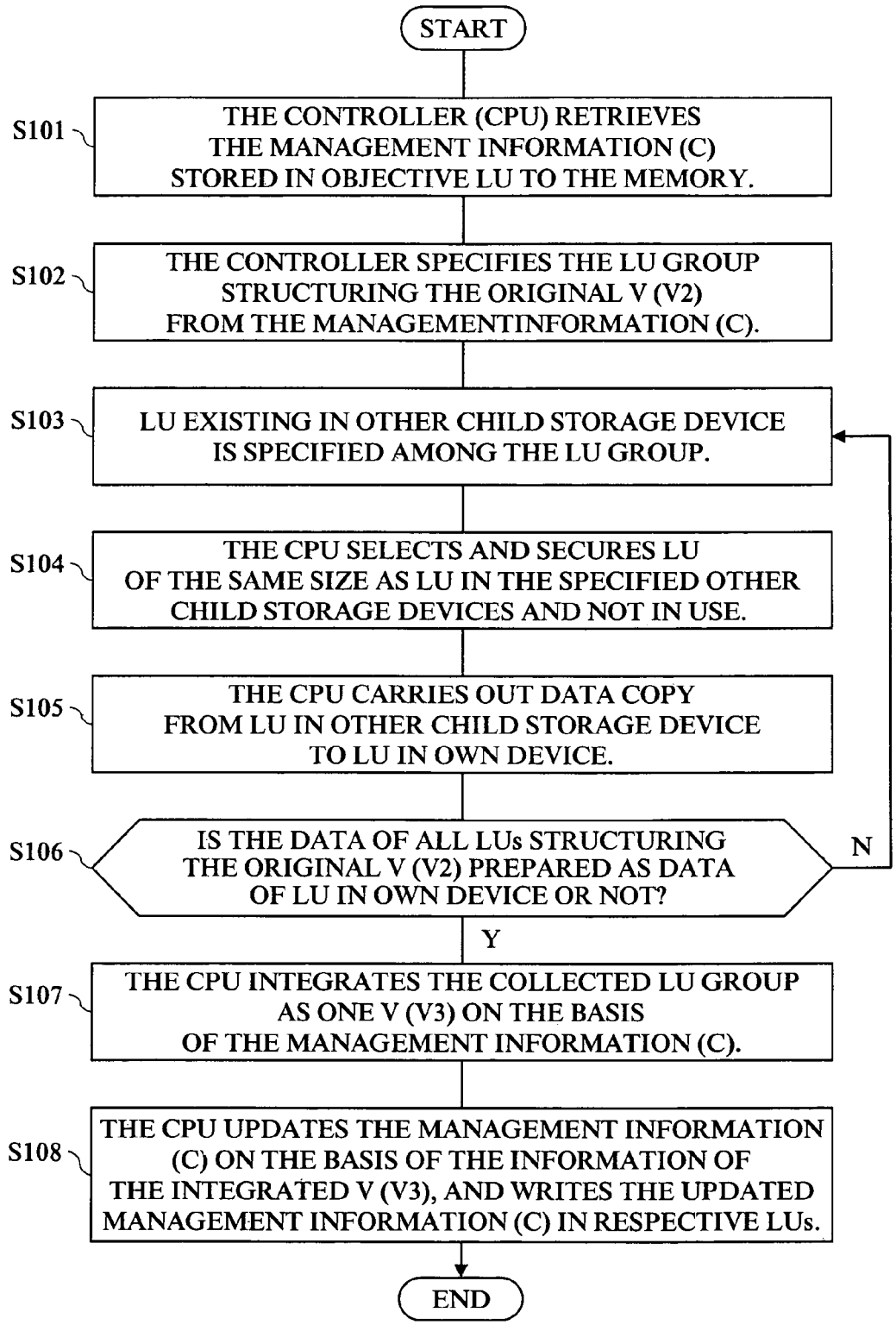
FIG. 6 is a diagram showing a flow of an integration process in the storage system according to the first embodiment of the present invention.

In FIG. 6, a flow of the integration process (process by the integration program (414)) is shown (S indicates a process step). First, at S101, the controller 401 (CPU 403) of the child storage device (S2) 120 (e.g.: #1) at the integration destination reads the management information (C) stored in the disks corresponding to LUs structuring objective volumes (V2, B), to the memory 404. At S102, the CPU 403 refers to the management information (C) on the memory 404, and specifies the LUs structuring the original volume (V2) that is a plurality of backup volumes (e.g.: B1 to B4). For example, with reference to the LUSE management table (T1) and the pair management table (T2), it is known that the LU-ID of the LUs corresponding to LUSE-ID "11" of the secondary V (V2) is "11," "12," "21," "32." Further, at S103, among the LUs, an LU group existing in other child storage device 120 is specified. For example, from the LU management table (T3), the child storage device #1 can recognize that LU whose LU-ID is "11," "12" exists in own device, and LU whose LU-ID is "21" exists in the storage device #2, and LU whose LU-ID is "32" exists in the storage device #3. At S104, the CPU 403 selects and secures LU of the same size as LUs (LU21, LU32) in the specified other child storage devices (S2) 120 and not in use in own device (e.g.: LU13, LU14). At S105, the CPU 403 carries out data copy from LUs in other child storage device (S2) 120 to LUs (LU13, LU14) secured in own device, among child storage devices 120. Thereby, it collects data of respective LUs into own device. At S106, the CPU 403 checks whether the data of all LUs structuring the original volume (V2) have been prepared as data of LUs (e.g.: LU11 to LU14) in own device or not. In the case where they have not been prepared (N), the procedure goes back to S103, and when they have been prepared (Y), at S107, the CPU 403 integrates the LUs (e.g.: LU11 to LU14) storing data of the original volume (V2) as one volume (V3) on the basis of the management information (C). At S108, the CPU 403 updates the management information (C) on the basis of the information of the integrated volume (V3) (FIG. 2), and writes the updated management information (C) on respective LUs structuring the volume (V3). In this manner, the volume (V3) becomes readable from the host device 102.

According to the first embodiment, even a disaster for the master site happens, it is possible to retrieve backup data from the host device 102 or the like at the remote site side.

(Second Embodiment)

Next, with reference to FIG. 7 to FIG. 8, a second embodiment of the present invention is explained hereinafter. In the second embodiment, in the host device at the remote site, integration process of objective volumes is carried out.

Figure 7:
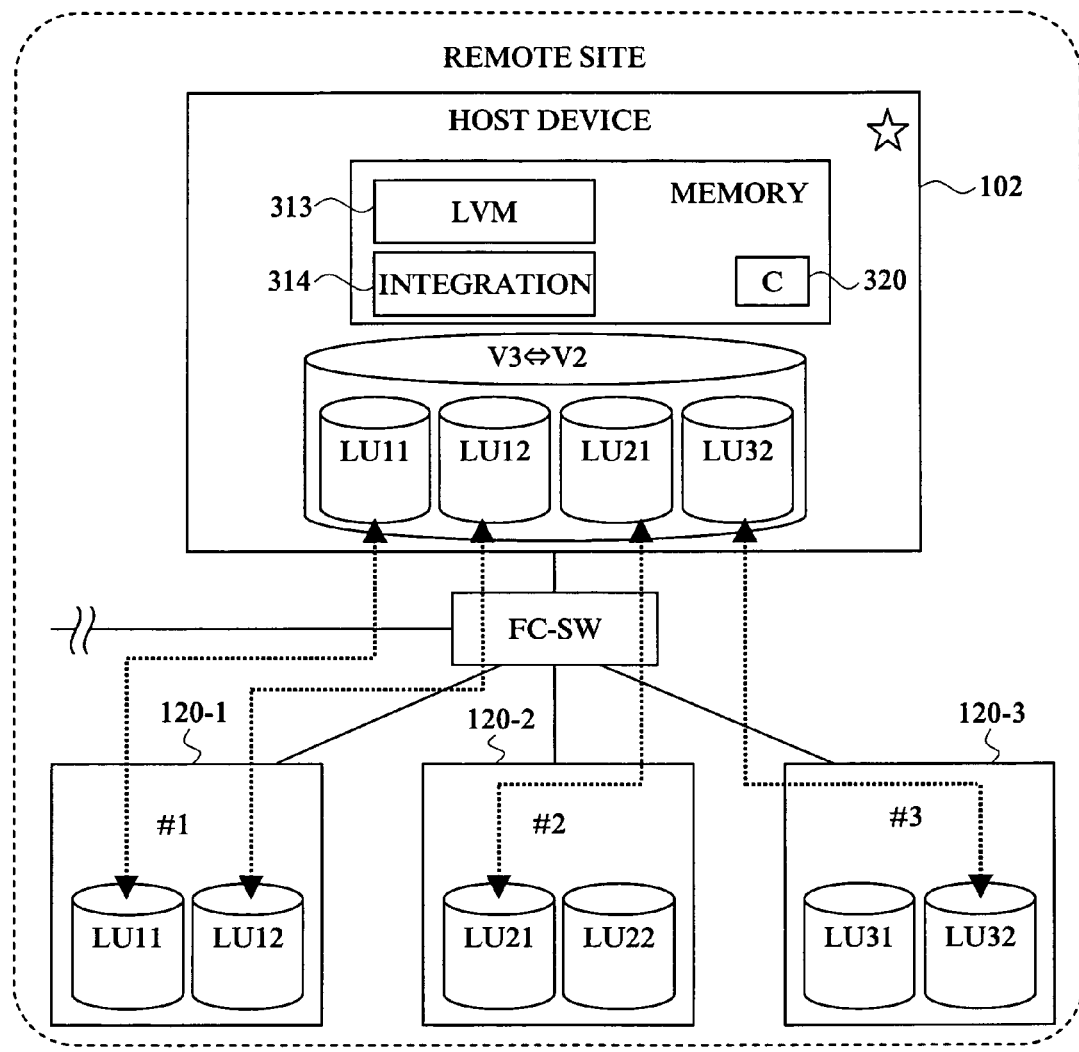
FIG. 7 is a diagram showing a structure (only remote site side) of a storage system according to a second embodiment of the present invention.

In FIG. 7, a system in the second embodiment is shown. In the second embodiment, in the same purpose and basic structure as those in the first embodiment, the management information (C) is stored in not the child storage device 120, but the host device 102 at the remote site. The structure of the master site side is same as that in FIG. 1 and the like of the first embodiment.

The host device 102 at the remote site has the storage use program, and for example general LVM (logic volume management) function (313). The LVM function (313) is the function to handle a plurality of logic volumes as one logic volume (meanwhile, this is different from the LUSE function in the storage device). Further, in the second embodiment, at the host device 102 side, an integration program (314) is arranged.

In case of disaster at the master site, in the host device 102 where the management information (C) is stored, on the basis of the read management information (C), in the same manner as in the first embodiment, data of LUs corresponding to objective volume (V2) is collected. And, the host device 102, by use of the LVM function (313) and the like, integrates LU group structuring the objective volume (V2) as one volume (V3), and retrieves the backup data.

Figure 8:
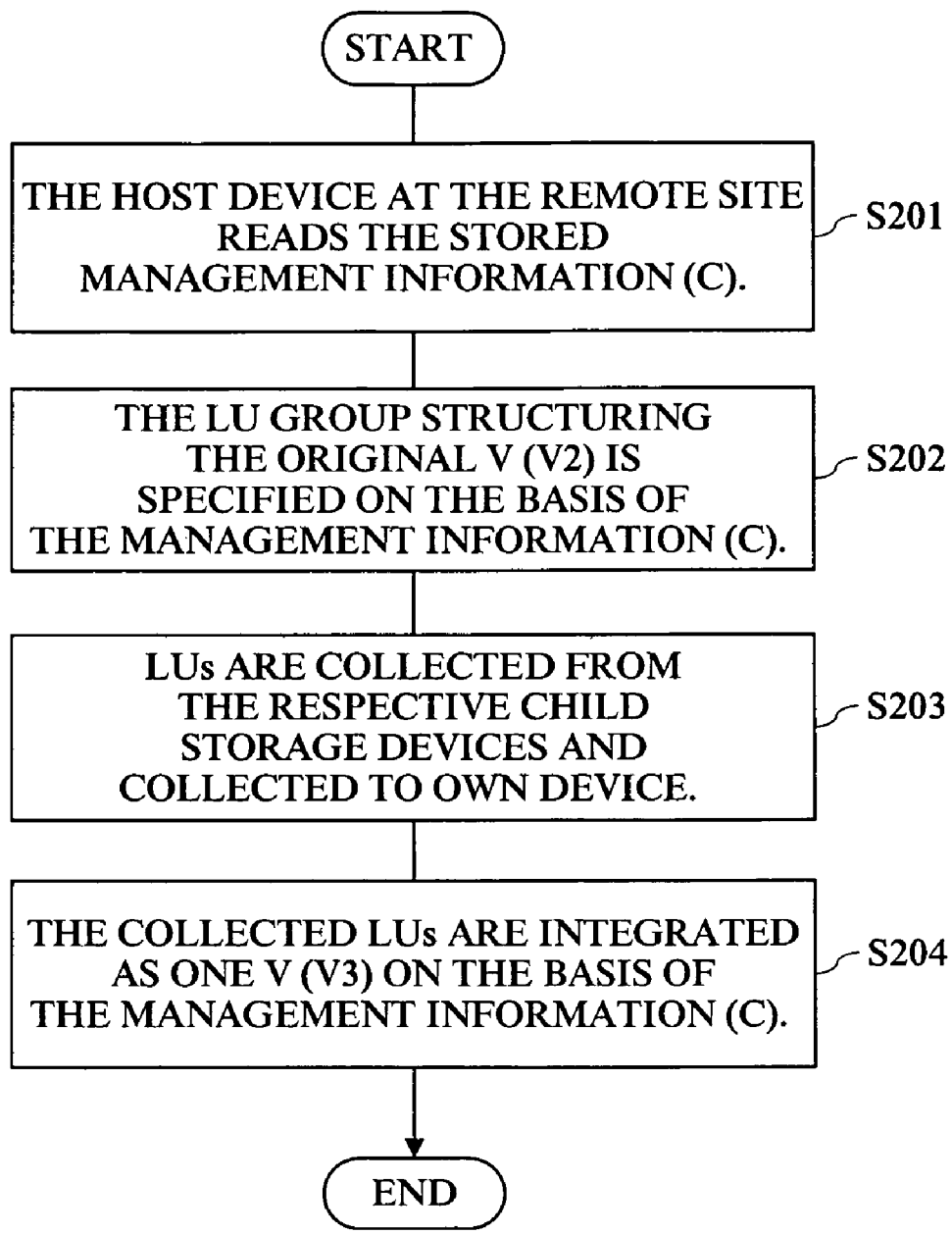
FIG. 8 is a diagram showing a flow of an integration process in the storage system according to the second embodiment of the present invention.

In FIG. 8, the integration process in the second embodiment is shown. At S201, the host device 102 at the remote site reads the management information (C) stored in own device. AT S202, the host device 102, on the basis of the read management information (C), specifies the LU group structuring the original volume (V2). At S203, the host device 102 retrieves data of objective LU from the respective child storage device (S2) 120 (#1 to #3), and collect date into own device. At S204, the host device 102, by use of the LVM function (313), integrates the collected LU group as one volume (V3) on the basis of the management information (C).

According to the second embodiment, even in case of a disaster at the master site, it is possible to retrieve backup data from the host device 102 or the like at the remote site side.

(Third Embodiment)

Next, with reference to FIG. 9 to FIG. 10, a third embodiment of the present invention is explained hereinafter. In the third embodiment, as a third method, a substitutional parent storage device is prepared at the remote site, and integration of objective volumes and data restore process are carried out.

Figure 9:
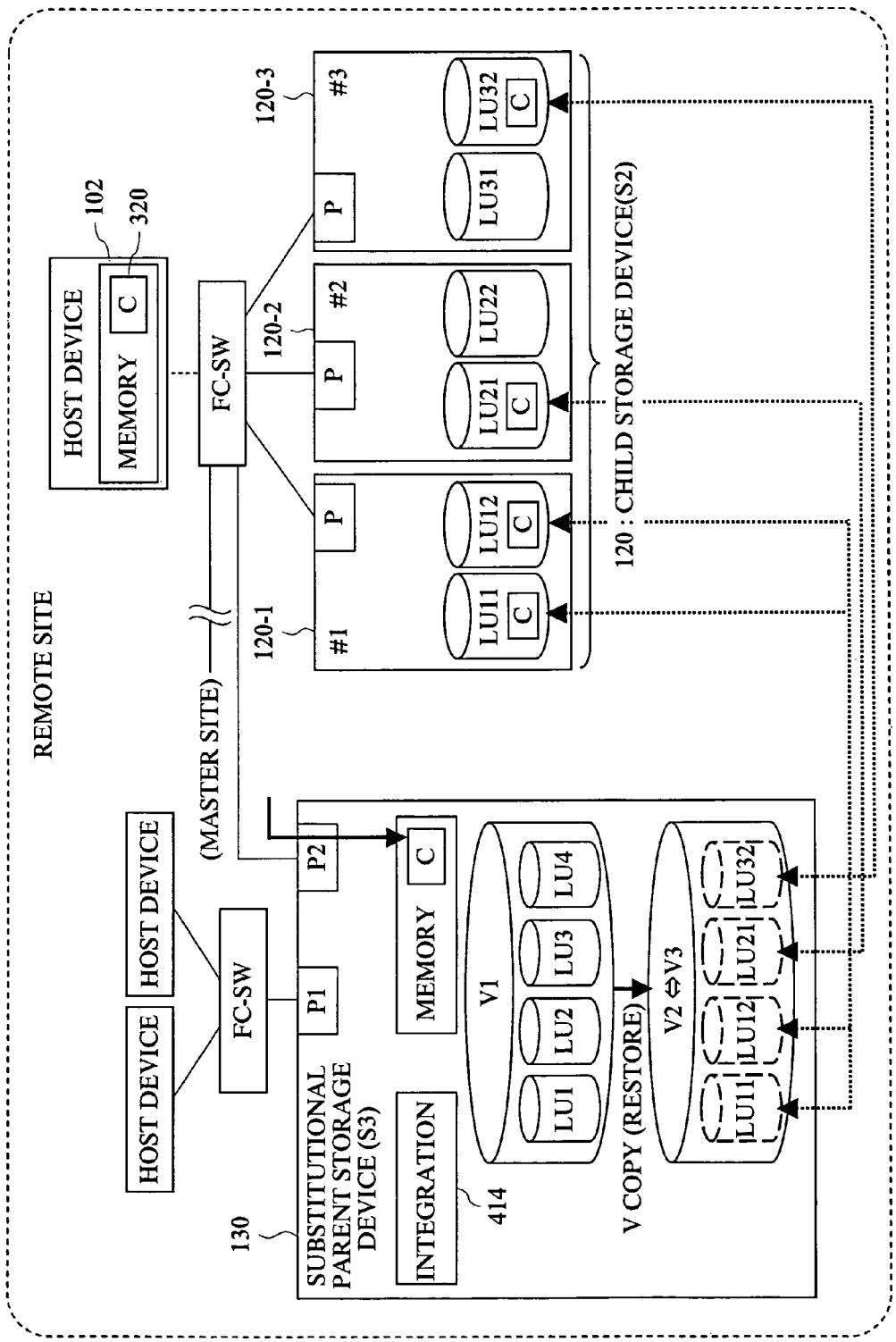
FIG. 9 is a diagram showing a structure (only remote site side) of a storage system according to a third embodiment of the present invention.

In FIG. 9, a system in the third embodiment is shown. The structure of the master site is same as mentioned above. In the third embodiment, the management information (C) is stored in the child storage device 120, or in the host device 102, at the remote site side, or in both of them. This example shows the case where the management information (C) is stored in both of them.

In case of disaster at the master site, in the remote site, a substitutional parent storage device (S3) 130 to the original (old) parent storage device (S1) 110 is prepared, and connected in the same manner. Meanwhile, the substitutional parent storage device (S3) 130 is not limited to the same structure as that of the original (old) parent storage device (S1) 110 (volume structure and the like are same). The substitutional parent storage device (S3) 130 has an integration program (414).

The substitutional parent storage device (S3) 130 reads the management information (C) stored in the host device 102 or the child storage device (S2) 120 (in LU) at the remote site, via communication process, into own device. For example, it reads the management information (C) from the host device 102 to memory. And, the substitutional parent storage device (S3) 130, on the basis of the read management information (C), in the same manner as mentioned above, collects data of LU group structuring objective volume (V2) and integrates them into one volume (V3). And, from the integrated volume (V3) that is restructured secondary V (V2), and carries out restore process to data of primary V (V1).

Further, for example, at the moment of the above action, from the host device 102 (or SVO) at the remote site connected to the substitutional parent storage device (S3) 130, to the substitutional parent storage device (S3) 130, request for integration process is sent. Thereby, in the same manner as in the first embodiment, the integration process of the above objective volume (V2) is carried out, and a response is sent to the host device 102.

Figure 10:
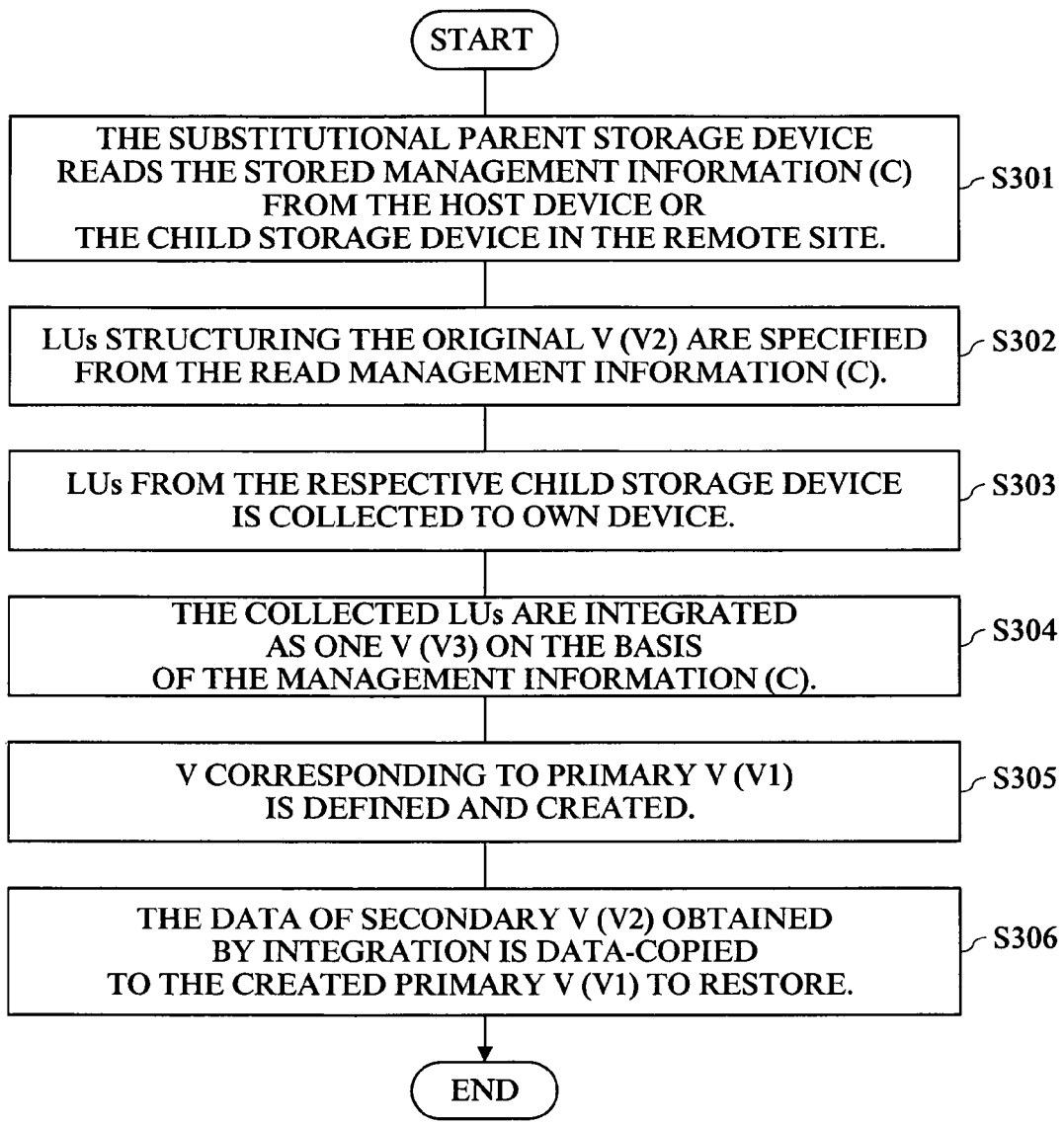
FIG. 10 is a diagram showing a flow of an integration process in the storage system according to the third embodiment of the present invention.

In FIG. 10, the integration process in the third embodiment is shown. At S301, the substitutional parent storage device (S3) 130 reads the stored management information (C), from the host device 102 or the child storage device (S2) 120 at the remote site, into own device. At S302, the substitutional parent storage device (S3) 130 specifies LU group and devices structuring the objective volume (V2), from the read management information (C). At S303, the substitutional parent storage device (S3) 130 reads out data of LUs from the respective child storage device (S2) 120 (#1 to #3) holding LUs, and collects date. At S304, the substitutional parent storage device (S3) 130 integrates the collected LU group as one volume (V3) on the basis of the management information (C). The data contents of integrated volume (V3) are same as those of the original secondary V (V2). Further, at S305, the substitutional parent storage device (S3) 130 defines and creates primary V (V1) corresponding to the original secondary (V2). Meanwhile, this may be made other process step. At S306, the substitutional parent storage device (S3) 130 copies the data of created volume (V3) by integration that is secondary V (V2) to primary V (V1), thereby restores the primary V (V1).

According to the third embodiment, even in case of a disaster at the master site, it is possible to restore the data of the primary V (V1) on the basis of backup data by the substitutional parent storage device (S3) 130.

(Fourth Embodiment)

Next, with reference to FIG. 11 to FIG. 12, a fourth embodiment of the present invention is explained hereinafter. The fourth embodiment is application to migration (replace) of parent storage device, to the first to third embodiments. This is not limited to the case of a disaster at the site. Further, in the present embodiment, there is no distinction between master site and remote site. In this example, as migration, the case to migrate data from an old parent storage device (S4) to a new parent storage device (S5) at site is shown.

Figure 11:
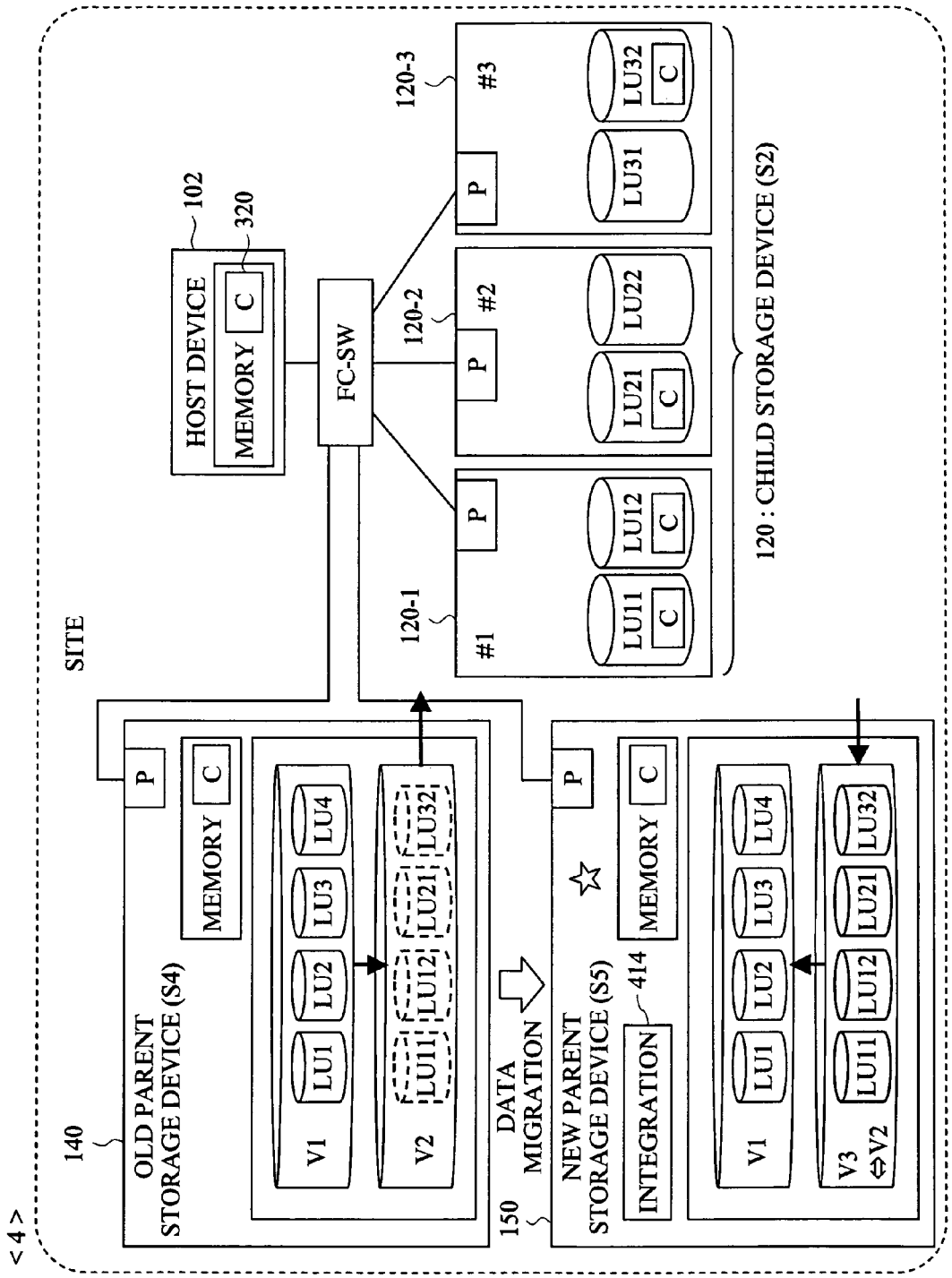
FIG. 11 is a diagram showing a structure of a storage system according to a fourth embodiment of the present invention.

In FIG. 11, at the site, an old parent storage device (S4) 140, a child storage device (S2) 120, and a new parent storage device (S5) 150 to become the migration destination are arranged. The new and old parent storage devices (S4, S5) have the same basic structure as the parent storage device (S1) 110 and the like in the first embodiment. From the old parent storage device (S4) 140 to the child storage device (S2) 120, in the same manner as mentioned previously, backup from the primary V (V1) to the secondary V (V2) is carried out, and the backup volume (B) is stored in a plurality of child storage devices (S2) 120.

Data migration (or structure migration) is carried out from the old parent storage device (S4) 140 to the new parent storage device (S5) 150. At this moment, the data of the volume (V2) backed up from the old parent storage device (S4) 140 to the child storage device (S2) 120 is migrated to the new parent storage device (S5) 150 by use of the method (integration and restore process) of the third embodiment.

Figure 12:
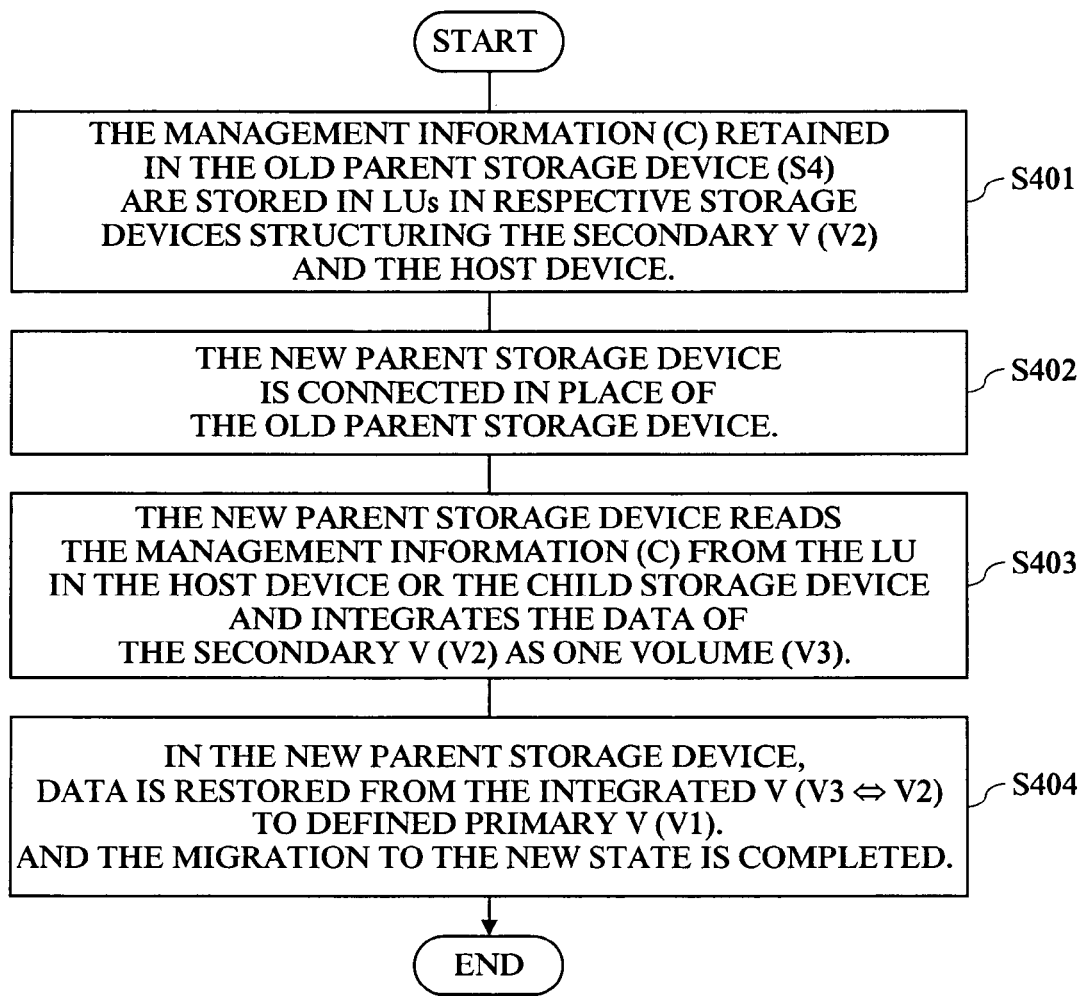
FIG. 12 is a diagram showing a flow of a data migration process in the storage system according to the fourth embodiment of the present invention.

In FIG. 12, the process of data migration in the fourth embodiment is shown. S401 is the same process (storage of management information (C)) as mentioned above. At S401, the management information (C) about the secondary V (V2) and the like stored in memory of the old parent storage device (S4) 140 is stored to LUs and the host device 102 in the respective child storage devices 120 structuring the secondary V (V2). According to the first to third methods mentioned above, the management information (C) is stored in any one of places (host device 102 and child storage device 120) at site. Or, at execution of the data migration, the process at S401 may be executed a fresh.

At S402, at this site, in the place of the old parent storage device (S4) 140, the new parent storage device (S5) 150 to become the data migration destination is connected.

At S403, the new parent storage device (S5) 150 reads the corresponding management information (C) in the host device 102 or the LU in the child storage device (S2) 120, and on the basis of this, in the same manner as mentioned above, integrates the data of LU group corresponding to the secondary V (V2) as one volume (V3).

At S404, in the new parent storage device (S5) 150, from the volume (V3) equivalent to the secondary V (V2) obtained by migration, to defined primary V (V1), data is restored by volume copy. Thereby, migration to new state is complete.

In the case when the same as in the fourth embodiment is realized by the conventional art method, it is necessary to prepare (connect or the like) a child storage device of the same structure as the old parent storage device (S4) 140 to the new storage device side (FIG. 16, FIG. 17). On the other hand, by using the method of the present embodiment, the child storage device (S2) 120 used in the old parent storage device (S4) 140 may be used as it is to the new parent storage device (S5) 150 side.

<1B>

Figure 13:
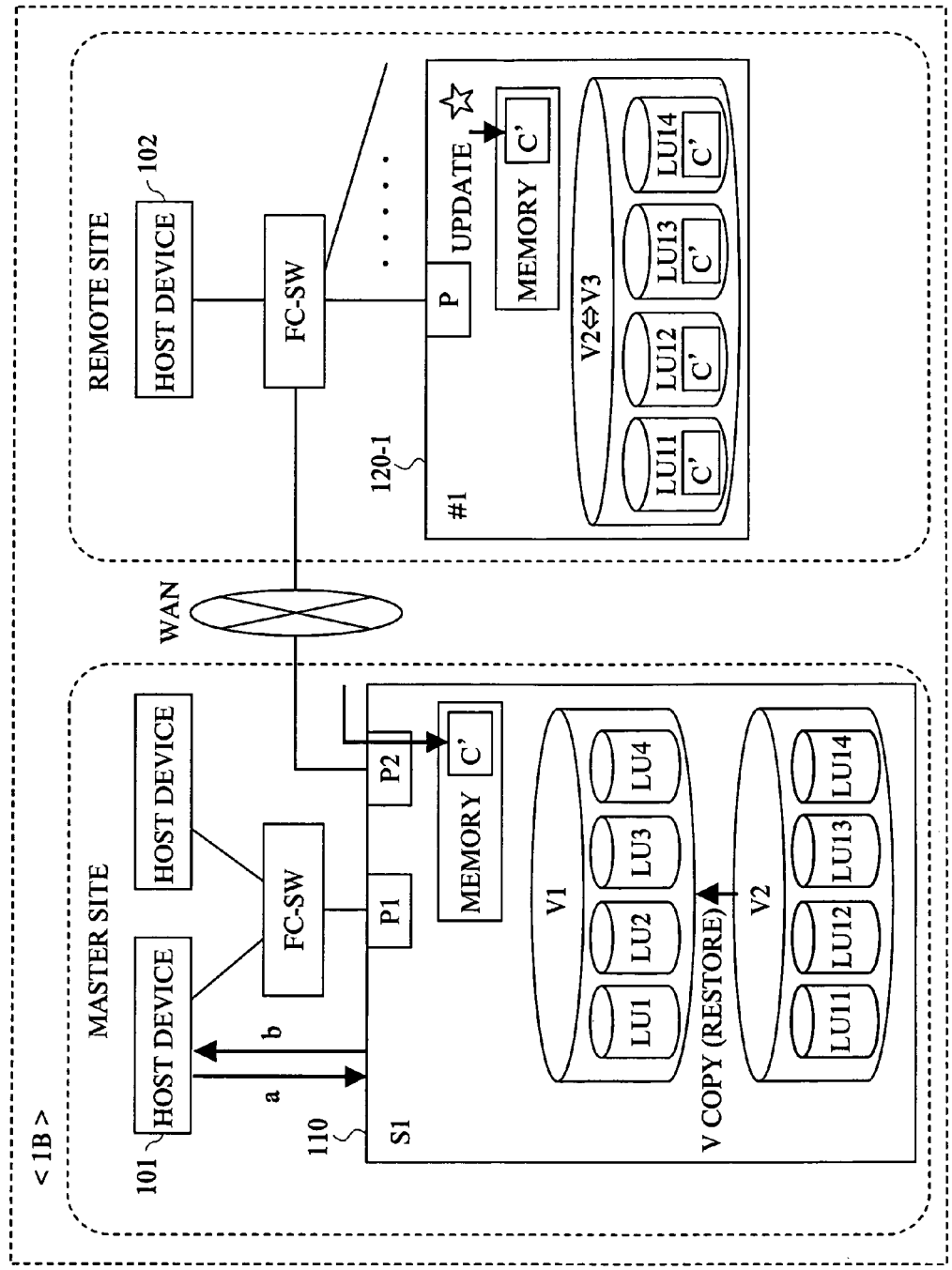
FIG. 13 is a diagram showing data restoration at a master site in an applied structure (1B) of the storage system according to the first embodiment of the present invention.

Next, in FIG. 13, the case is shown that is an application of the first embodiment, where as the structure (1B) in connection with the above first method, after the backup data is integrated into one volume (V3) at the child storage device (S2) 120 (e.g.: #1) at the remote site, data restore process to the parent storage device (S1) 110 at the master site is carried out. It is the case of not only the action until retrieving backup data at the remote site side, but also the action to reflect to the master site by use of backup data thereafter.

According to the first method mentioned above, according to request from the host device 102, for example into the child storage device (#1) 120-1, the backup data is collected as one volume (V3). Thereafter, the corresponding management information (C) is updated in the child storage device (#1) 120-1. Thereby, to all the LUs (LU11, LU12, LU13, LU14) structuring the volume (V3) equivalent to the secondary V (V2) in the child storage device (#1) 120-1, updated management information (C') is written. The action to this point is an extension of the action to copy (collect) LU in other child storage device 120 to the child storage device (#1) 120-1 and is carried out automatically. At the moment when the actions to this point are completed, end notification is made from the child storage device (#1) 120-1 to the host device 102.

Next, the data restore process to the parent storage device (S1) 110 at the master site is carried out in the same manner as in the third method mentioned above. For example, from the host device 101 (or SVP) connected to the parent storage device (S1) 110 to the parent storage device (S1) 110, a request for data restore or the like is sent (a). And, the parent storage device (S1) 110 that receives the request reads the management information (C') written into LU in its inside, from the child storage device (#1) 120-1. And, the parent storage device (S1) 110 restores (or updates) the secondary V (V2) equivalent, on the basis of the management information (C'), thereafter, carries out data restore from the secondary V (V2) to the primary V (V1). At the moment when the restore to the primary V (V1) is completed in this manner, an end notification (b) is made from the parent storage device (S1) 110 to the host device 101.

<2B>

Next, in FIG. 7 and the like, the case is shown that is an application of the second embodiment, where as the structure (2B) in connection with the above second method, after the backup data is integrated into one volume (V3) at the host device 102 at the remote site, data restore process to the parent storage device (S1) 110 at the master site is carried out.

Action according to the condition after a disaster at the master site is carried out. Since there is no update in LUs (LU11, LU12, LU21, LU32) structuring the secondary V (V2), there is no update in the management information (C).

First, in the case when the original parent storage device (S1) 110 at the master site could not be used, data restore process from the secondary V (V2) stored in the parent storage device (S1) 110 to the primary V (V1) is carried out.

Further, in the case when the original parent storage device (S1) 110 at the master site could be used or the like, if a substitutional (new) parent storage device is prepared, the same action as the above third method is carried out (reading the management information (C) from the host device 102 at the remote site and the like).

<3B>

Figure 14:
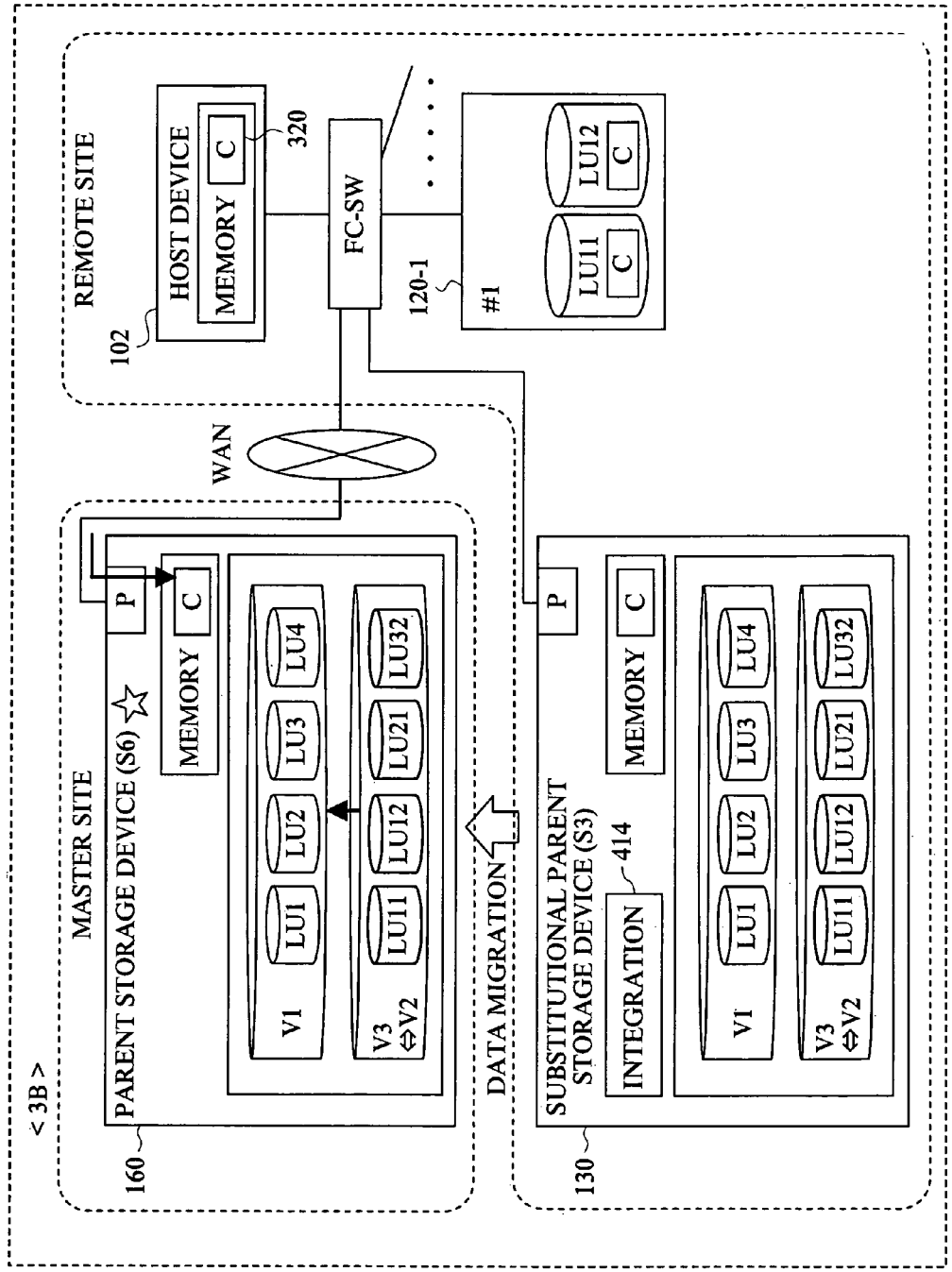
FIG. 14 is a diagram showing data migration to a master site in an applied structure (3B) of the storage system according to the third embodiment of the present invention.

Next, in FIG. 14, the case is shown that is an application of the third embodiment, where as the structure (3B) in connection with the above third method, after the data restore process to the substitutional parent storage device (S3) 130 at the remote site is carried out, the data restore process to the parent storage device (S6) 160 (same structure as S1) at the master site is carried out.

The same procedures as the action of the integration (data store process of primary V (V1)) of backup data (V2) to the substitutional parent storage device (S3) 130 in the third method mentioned above are used. First, by the action, in the substitutional parent storage device (S3) 130, a secondary V (V2) and a primary V (V1) are structured. Next, by use of the above procedures, data migration from the substitutional storage device (S3) 130 at the remote site, to the parent storage device (S6) 160 at the master site is carried out. By the data migration, in the parent storage device (S6) 160 at the master site, an objective secondary V (V2) is structured, and data of the primary V (V1) is restored.

By the above respective structures (1B,2B,3B), not only retrieving of backup data at the remote site side, but also data restore, recovery and the like at the master site side are realized.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention may be applied to a remote backup system, a disaster recovery system and the like.

What is claimed is:

1. A method for remote backup, in a storage system in which a parent storage device including a plurality of first disk devices is arranged at a master site, and a plurality of child storage devices including a plurality of second disk devices are arranged at a remote site, and the patent storage device and the child storage devices are remotely connected for communications by an external connection, the method comprising:

arranging, in the parent storage device, a primary logical volume configured by integrating a plurality of first logical units prepared on the plurality of first disk devices and provided to a host computer, and a secondary logical volume configured by integrating a plurality of second logical units, the plurality of second logical units provided by the plurality of the child storage devices, the primary logical volume and the secondary logical volume together comprising a copy pair;

carrying out a remote copy backup process of the primary logical volume to the plurality of child storage devices, by copying data stored in the plurality of first logical units in the primary logical volume to the plurality of second logical units in the plurality of child storage devices through the secondary logical volume;

storing management information in the respective plurality of second logical units, the management information including first management information indicating relationship between the second logical volume and the plurality of second logical units and second management information indicating which of the plurality of child storage devices stores each of the plurality of second logical units; and wherein when the parent storage device is damaged, specifying one of the child storage devices which stores one or more second logical units in the plurality of second logical units as an integration destination;

copying data stored in other second logical units in other child storage devices to the specified child storage device by referring to the management information stored in the one or more second logical units in the specified child storage device; and configuring, in the specified child storage device, a third volume by integrating the one or more second logical units and the copied other second logical units, and providing the integrated third logical volume to the host computer.

2. The method for remote backup according to claim 1, wherein the management information is written into plural volumes of backup volumes of the second logical units.

3. The method for remote backup according to claim 1, wherein the management information is stored in the host device connected to the one or more child storage devices.

4. A method for remote backup according to claim 1, wherein in the case where to the plurality of child storage devices, the first storage device to become a data migration destination from the parent storage device is connected, a data restore process is carried out by volume copy from the integrated third logical volume to the volume corresponding to the primary volume.

5. A storage system, comprising:

a parent storage device including a plurality of first disk devices arranged at a master site;

a plurality of child storage devices including a plurality of second disk devices arranged at a remote site, the parent storage device and the child storage devices are remotely connected for communications by an external connection, wherein, in the parent storage device, a primary logical volume configured to be an integrated plurality of first logical units prepared on the plurality of first disk devices and provided to a host computer, and a secondary logical volume configured to be an integrated plurality of second logical units, the plurlurality of second logical units provided by the plurality of the child storage devices, the primary logical volume and the secondary logical volume together comprising a copy pair, the system configured to carry out a remote backup process of the primary logical volume to the plurality of child storage devices, by copying data stored in the plurality of first logical units in the primary logical volume to the plurality of second logical units in the plurality of child storage devices through the secondary logical volume;

a first device of the plurality of the child storage devices or a host device connected thereto at the remote site, storing management information in the respective plurality of second logical units, the management information including first management information indicating relationship between the second logical volume and the plurality of second logical units and second management information indicating which of the plurality of child storage devices stores each of the plurality of second logical units; and wherein when the parent storage device is damaged, the system is further configured to:

specify one of the child storage devices which stores one or more second logical units in the plurality of second logical units as an integration destination;

copy data stored in other second logical units in other child storage devices to the specified child storage device by referring to the management information stored in the one or more second logical units in the specified child storage device; and configure, in the specified child storage device, a third volume by integrating the one or more second logical units and the copied other second logical units, and providing the integrated third logical volume to the host computer.

6. The storage system according to claim 5, wherein, in the remote site, when the data of backup volumes of the second logical units is read or made readable, on the basis of the management information, data of plural volumes of the backup is collected by data copy with the plurality of child storage devices, and integrated into the integrated third logical volume.

7. The storage system according to claim 6, wherein, from the host device connected to the child storage devices in the remote site, to a designated child storage device, a request is sent, and the child storage device that receives the request carries out the integration process and sends a response to the host device, and the host device that receives the response reads the data of the integrated third logical volume from the child storage device.

8. The storage system according to claim 6,
wherein, after the integration, in the parent storage device at the master site, the management information updated by the integration is read and referred to, and on the basis thereof, to the secondary logical volume in the inside of the parent storage device, data of the integrated third logical volume of the one child storage device is acquired by data copy, and a data restore process is carried out by volume copy from the secondary volume to the primary volume.

9. The storage system according to claim 5,
wherein, in the case when in the remote site, a substitutional parent storage device for the parent storage device is connected to the plurality of child storage devices,
in the substitutional parent storage device, the management information stored in the second logical units in the remote site is read and referred to, and on the basis thereof, data of plural volumes of the backup is collected by data copy with the plurality of child storage devices and integrated into the integrated third logical volume, and a data restore process is carried out by volume copy from the integrated third logical volume to the volume corresponding to the primary volume.

10. The storage system according to claim 9,
wherein, after the data restore process of the primary volume in the substitutional parent storage device at the remote site, in the parent storage device at the master site, the management information is read and referred to, and on the basis thereof, to the secondary volume in the inside of the parent storage device, data of the integrated third logical of the substitutional parent storage device is acquired by data copy, and a data restore process is carried out by volume copy from the secondary volume to the primary volume.

11. The storage system according to claim 5,
wherein in the case where to the plurality of child storage devices, the first storage device to become a data migration destination from the parent storage device is connected,
the system is configured to perform a data restore process is carried out by volume copy from the integrated third logical volume to the volume corresponding to the primary volume.

12. The storage system according to claim 5,
wherein the management information is written into plural volumes of backup volumes of the second logical units to be stored in the plurality of child storage devices at the remote site.

13. The storage system according to claim 5,
wherein the management information is stored into the host device connected to the plurality of child storage devices at the remote site.

14. The storage system according to claim 5,
wherein the parent storage device carries out a logic unit size expansion process to handle plural logic units as one logic unit, and
the primary volume and the secondary volume arc volumes by the logic unit size expansion process, and the volume of backup volumes of the second logical units are divided into plural logic units and stored in the plural child storage devices.

15. The storage system according to claim 5,
wherein the management information includes the management information of the pair of the primary volume and the secondary volume, and, the information of the correspondence of the secondary volume and plural volumes of backup volumes of the second logical units and a storage device that contains them.

* * * * *